(12) United States Patent
Chi et al.

(10) Patent No.: US 10,854,165 B2
(45) Date of Patent: Dec. 1, 2020

(54) METHOD FOR CALIBRATING AN AUGMENTED REALITY DEVICE

(71) Applicant: Magic Leap, Inc., Plantation, FL (US)

(72) Inventors: Yu-Tseh Chi, Cupertino, CA (US); Jean-Yves Bouguet, Palo Alto, CA (US); Divya Sharma, San Jose, CA (US); Lei Huang, Fremont, CA (US); Dennis William Strelow, San Jose, CA (US); Etienne Gregoire Grossmann, Menlo Park, CA (US); Evan Gregory Levine, Mountain View, CA (US); Adam Harmat, Sunnyvale, CA (US); Ashwin Swaminathan, Dublin, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/230,169

(22) Filed: Dec. 21, 2018

(65) Prior Publication Data
US 2019/0197982 A1    Jun. 27, 2019

Related U.S. Application Data

(60) Provisional application No. 62/609,242, filed on Dec. 21, 2017.

(51) Int. Cl.
*G09G 5/00*    (2006.01)
*G06T 7/00*    (2017.01)
*G06T 7/80*    (2017.01)

(52) U.S. Cl.
CPC ........... *G09G 5/003* (2013.01); *G06T 7/0002* (2013.01); *G06T 7/85* (2017.01); *G06T 2207/10012* (2013.01)

(58) Field of Classification Search
CPC .......... G06F 3/147; G06T 2207/10012; G06T 7/0002; G06T 7/85; G09G 2320/0693; G09G 5/003
See application file for complete search history.

(56) References Cited

U.S. PATENT DOCUMENTS

| | | |
|---|---|---|
| 2011/0205340 A1 | 8/2011 | Garcia et al. |
| 2016/0104285 A1 | 4/2016 | Pettegrew et al. |
| (Continued) | | |

OTHER PUBLICATIONS

PCT/US2018/067214, "International Search Report and Written Opinion", dated Feb. 27, 2019, 9 pages.

*Primary Examiner* — Insa Sadio
(74) *Attorney, Agent, or Firm* — Kilpatrick Townsend & Stockton LLP

(57) ABSTRACT

A method for calibrating a device having a first sensor and a second sensor. The method includes capturing sensor data using the first sensor and the second sensor. The device maintains a calibration profile including a translation parameter and a rotation parameter to model a spatial relationship between the first sensor and the second sensor. The method also includes determining a calibration level associated with the calibration profile at a first time. The method further includes determining, based on the calibration level, to perform a calibration process. The method further includes performing the calibration process at the first time by generating one or both of a calibrated translation parameter and a calibrated rotation parameter and replacing one or both of the translation parameter and the rotation parameter with one or both of the calibrated translation parameter and the calibrated rotation parameter.

18 Claims, 17 Drawing Sheets

(56) References Cited

U.S. PATENT DOCUMENTS

| | | | |
|---|---|---|---|
| 2016/0217614 A1* | 7/2016 | Kraver | G06T 19/006 |
| 2017/0292828 A1 | 10/2017 | Hillebrand et al. | |
| 2017/0295358 A1* | 10/2017 | Cabral | H04N 5/247 |
| 2018/0096489 A1 | 4/2018 | Cohen et al. | |

* cited by examiner

METHOD FOR CALIBRATING AN AUGMENTED REALITY DEVICE

CROSS-REFERENCES TO RELATED APPLICATIONS

This application claims priority to U.S. Provisional Patent Application No. 62/609,242 filed Dec. 21, 2017 titled "METHOD FOR CALIBRATING AN AUGMENTED REALITY DEVICE", the entire disclosure of which is hereby incorporated by reference, for all purposes, as if fully set forth herein.

BACKGROUND OF THE INVENTION

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR," scenario typically involves presentation of digital or virtual image information without transparency to other actual real-world visual input; an augmented reality, or "AR," scenario typically involves presentation of digital or virtual image information as an augmentation to visualization of the actual world around the user.

Despite the progress made in these display technologies, there is a need in the art for improved methods, systems, and devices related to augmented reality systems, particularly, display systems.

SUMMARY OF THE INVENTION

The present disclosure relates generally to methods and systems related to calibration of an augmented reality (AR) device. More particularly, embodiments of the present disclosure provide methods and systems for calibrating an AR device while the device is powered on and in use by adjusting one or more parameters of a calibration profile. Although the present invention is described in reference to an AR device, the disclosure is applicable to a variety of applications in computer vision and image display systems.

In accordance with a first aspect of the present invention, a method for calibrating a device having a first sensor and a second sensor is provided. The method includes capturing sensor data using the first sensor and the second sensor. In some embodiments, the device maintains a calibration profile to model a spatial relationship between the first sensor and the second sensor. In some embodiments, the calibration profile includes a translation parameter and a rotation parameter. The method may also include determining a calibration level associated with the calibration profile at a first time. The method may further include determining, based on the calibration level, whether to perform a calibration process. The method may further include performing the calibration process at the first time by generating one or both of a calibrated translation parameter and a calibrated rotation parameter and replacing one or both of the translation parameter and the rotation parameter with one or both of the calibrated translation parameter and the calibrated rotation parameter.

In some embodiments, performing the calibration process at the first time includes replacing only the rotation parameter with the calibrated rotation parameter. In some embodiments, performing the calibration process at the first time includes generating both the calibrated translation parameter and the calibrated rotation parameter and replacing both the translation parameter and the rotation parameter with the calibrated translation parameter and the calibrated rotation parameter. In some embodiments, the method further includes determining a second calibration level associated with the calibration profile at a second time, determining, based on the second calibration level, to perform a second calibration process, and performing the second calibration process at the second time by generating a second calibrated translation parameter and a second calibrated rotation parameter and replacing the translation parameter and the rotation parameter with the second calibrated translation parameter and the second calibrated rotation parameter. In some embodiments, the calibration level is a first calibration level, the calibration process is a first calibration process, and the rotation parameter is a first calibrated rotation parameter.

In some embodiments, the sensor data includes one or more first images captured using the first sensor and one or more second images captured using the second sensor. In some embodiments, one or both of the calibrated translation parameter and the calibrated rotation parameter are generated using the sensor data. In some embodiments, the calibration level is determined based on the sensor data. In some embodiments, the method further includes capturing additional sensor data using an additional sensor that is separate from the first sensor and the second sensor. In some embodiments, the calibration level is determined based on the additional sensor data. In some embodiments, determining, based on the first calibration level, to perform the first calibration process includes determining that the first calibration level is greater than a calibration threshold and determining, based on the second calibration level, to perform the second calibration process includes determining that the second calibration level is less than the calibration threshold.

In accordance with a second aspect of the present invention, a device is provided. The device may include a first sensor and a second sensor configured to capture sensor data. The device may also include a memory device configured to store a calibration profile modeling a spatial relationship between the first sensor and the second sensor, the calibration profile including a translation parameter and a rotation parameter. The device may further include a processor coupled to the first sensor, the second sensor, and the memory device. In some embodiments, the processor is configured to perform operations including determining a calibration level associated with the calibration profile at a first time. The operations may also include determining, based on the calibration level, to perform a calibration process. The operations may further include performing the calibration process at the first time by generating one or both of a calibrated translation parameter and a calibrated rotation parameter and replacing one or both of the translation parameter and the rotation parameter with one or both of the calibrated translation parameter and the calibrated rotation parameter.

In some embodiments, performing the calibration process at the first time includes replacing only the rotation parameter with the calibrated rotation parameter. In some embodiments, performing the calibration process at the first time includes generating both the calibrated translation parameter and the calibrated rotation parameter and replacing both the translation parameter and the rotation parameter with the calibrated translation parameter and the calibrated rotation parameter. In some embodiments, the operations further include determining a second calibration level associated with the calibration profile at a second time, determining, based on the second calibration level, to perform a second calibration process, and performing the second calibration process at the second time by generating a second calibrated translation parameter and a second calibrated rotation parameter and replacing the translation parameter and the rotation parameter with the second calibrated translation parameter and the second calibrated rotation parameter. In some embodiments, the calibration level is a first calibration level, the calibration process is a first calibration process, and the rotation parameter is a first calibrated rotation parameter.

In some embodiments, the sensor data includes one or more first images captured using the first sensor and one or more second images captured using the second sensor. In some embodiments, one or both of the calibrated translation parameter and the calibrated rotation parameter are generated using the sensor data. In some embodiments, the calibration level is determined based on the sensor data. In some embodiments, the device further includes an additional sensor configured to capture additional sensor data. In some embodiments, the additional sensor is separate from the first sensor and the second sensor. In some embodiments, the calibration level is determined based on the additional sensor data. In some embodiments, determining, based on the first calibration level, to perform the first calibration process includes determining that the first calibration level is greater than a calibration threshold and determining, based on the second calibration level, to perform the second calibration process includes determining that the second calibration level is less than the calibration threshold.

In accordance with a third aspect of the present invention, a non-transitory computer-readable medium for calibrating a device having a first sensor and a second sensor is provided. The non-transitory computer readable medium may include instructions that, when executed by a processor, cause the processor to perform operations. The operations may include the method described in accordance with the first aspect of the present invention.

In accordance with a fourth aspect of the present invention, a method for calibrating an augmented reality device is provided. The method may include accessing a calibration profile including at least one translation parameter and at least one rotation parameter. The method may also include capturing, using a first camera of the augmented reality device, one or more images from the first camera of a first field of view. The method may further include capturing, using a second camera of the augmented reality device, one or more images from the second camera of a second field of view. In some embodiments, the second field of view at least partially overlaps the first field of view. The method may further include comparing at least one of the one or more images from the first camera to at least one of the one or more images from the second camera. The method may further include determining a deformation amount between a first position of the first camera in relation to a second position of the second camera based on the comparison. The method may further include determining whether the deformation amount is greater than a deformation threshold. The method may further include in response to determining that the deformation amount is greater than the deformation threshold: identifying a plurality of matched features present in the one or more images from the first camera and the one or more images from the second camera, partitioning the one or more images from the first camera and the one or more images from the second camera into a plurality of bins, determining, for each bin of the plurality of bins, a quantity of the plurality of matched features located within each bin of the plurality of bins, determining, for each bin of the plurality of bins, that the quantity is greater than a feature threshold, performing a first calibration process by minimizing a first error equation that is a function of a first calibrated rotation parameter to generate the first calibrated rotation parameter; and replacing the at least one rotation parameter in the calibration profile with the first calibrated rotation parameter.

In some embodiments, the method further includes determining whether the deformation amount is less than the deformation threshold and in response to determining that the deformation amount is less than the deformation threshold: capturing, using a plurality of cameras of the augmented reality device including the first camera and the second camera, a plurality of map points, generating a sparse map, the sparse map including a group of map points as seen from a plurality of camera pose positions of the first camera and the second camera, aligning the group of map points of the sparse map, determining, based on the sparse map, that an online calibration trigger is satisfied, performing a second calibration process by minimizing a second error equation that is a function of a second calibrated translation parameter and a second calibrated rotation parameter to generate the second calibrated translation parameter and the second calibrated rotation parameter, and replacing the at least one rotation parameter in the calibration profile with the second calibrated rotation parameter and the at least one translation parameter in the calibration profile with the second calibrated translation parameter. In some embodiments, determining whether the deformation amount is greater than the deformation threshold occurs at a first time and determining whether the deformation amount is less than the deformation threshold occurs at a second time. In some embodiments, the first time precedes the second time. In some embodiments, the second time precedes the first time. In some embodiments, the first time is simultaneous with the second time. In some embodiments, the first time is concurrent with the second time.

In accordance with a fifth aspect of the present invention, an augmented reality device having a calibration profile including a translation parameter and a rotation parameter is provided. The augmented reality device may include a first camera configured to capture one or more first images. The augmented reality device may also include a second camera configured to capture one or more second images. The augmented reality device may further include a processor coupled to the first camera and the second camera. In some embodiments, the processor is configured to perform operations including determining, based on a deformation amount of the first camera in relation to the second camera, that the augmented reality device is deformed at a first time and in response to determining that the augmented reality device is deformed at the first time: performing a first calibration process to generate a first calibrated rotation parameter and replacing the rotation parameter in the calibration profile with the first calibrated rotation parameter.

Numerous benefits are achieved by way of the present invention over conventional techniques. For example, conventional techniques may require a user to repeatedly bring an AR device back to the factory for recalibration. Factory calibration may include making physical measurements on the device using precise instruments, which is time-consuming and expensive for the user of the AR device. In contrast, the present invention allows calibration while the AR device is powered on and in use, providing real-time calibration that is responsive to a particular strain placed on the device based on the particular use of the device. For example, when an AR device is used at warmer temperatures, heat may cause the device to partially warp or expand, thereby rendering any factory calibration inaccurate for the current use. Furthermore, because calibration according to the present invention may be based on captured camera images, it may provide better overall performance in comparison to factory calibration if deformation of the AR device has occurred by providing better alignment of virtual images which are generated based in part on the captured camera images. The method of calibration presented herein is also beneficial in that only rotation corrections are made to the calibration profile when the AR device is deformed beyond some threshold. Under such high deformation circumstances, translation corrections are found to be highly erratic and may result in poor performance of the AR device. Accordingly, the method of calibration provides a "routing"-like functionality in which one of two different process paths is selected based on a deformation amount of the AR device. Other benefits of the present disclosure will be readily apparent to those skilled in the art.

DETAILED DESCRIPTION OF SPECIFIC EMBODIMENTS

Although optical devices, particularly those with head-mounted displays, may be calibrated with highly sophisticated instruments while in the factory, during use such devices may quickly become deformed due to heat, use, and various forms of wear and tear, causing the factory calibration to become inaccurate. One possible solution is for a user to repeatedly bring the optical device back to the factory for recalibration. To avoid the obvious costs of such a solution, embodiments described herein allow for an accurate and robust run-time calibration while the device is in use, eliminating the need for factory recalibration. Embodiments look to a current calibration level of the device to determine which of two types of calibration processes to perform. A first calibration process limited to rotation corrections is performed when the device is significantly out of calibration, and a second calibration including rotation and translation corrections is performed under slight miscalibration. Embodiments described herein are useful not only for optical devices, but for any device having two sensors with a spatial relationship that is modeled by a translation component and a rotation component.

Figure 1:
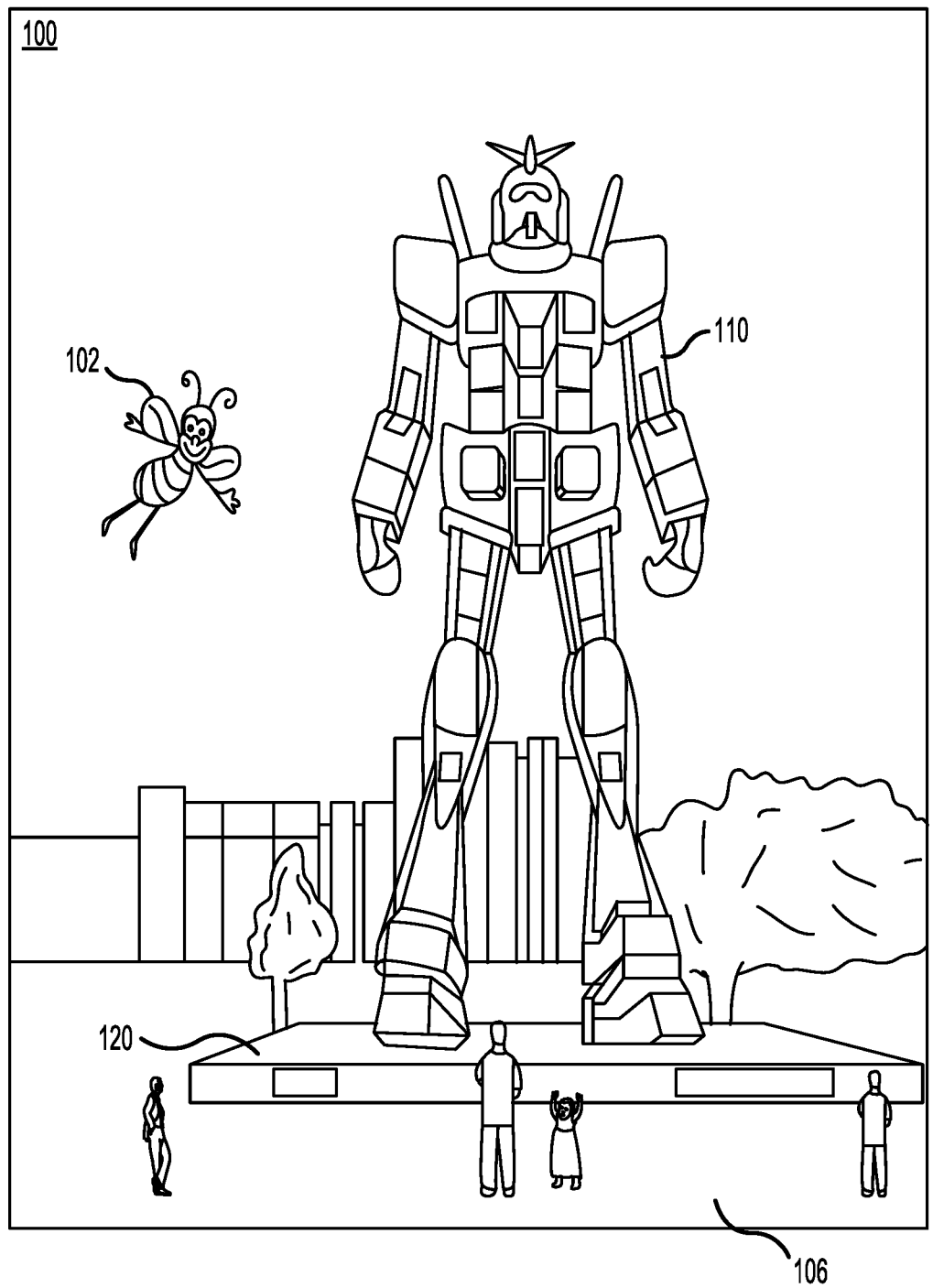
FIG. 1 is a drawing illustrating an augmented reality (AR) scene as viewed through a wearable AR device according to an embodiment described herein.

FIG. 1 is a drawing illustrating an augmented reality (AR) scene as viewed through a wearable AR device according to an embodiment described herein. Referring to FIG. 1, an augmented reality scene 100 is depicted wherein a user of an AR technology sees a real-world park-like setting 106 featuring people, trees, buildings in the background, and a concrete platform 120. In addition to these items, the user of the AR technology also perceives that he "sees" a robot statue 110 standing upon the real-world platform 120, and a cartoon-like avatar character 102 flying by, which seems to be a personification of a bumble bee, even though these elements (character 102 and statue 110) do not exist in the real world. Due to the extreme complexity of the human visual perception and nervous system, it is challenging to produce a virtual reality (VR) or AR technology that facilitates a comfortable, natural-feeling, rich presentation of virtual image elements amongst other virtual or real-world imagery elements.

Figure 2:
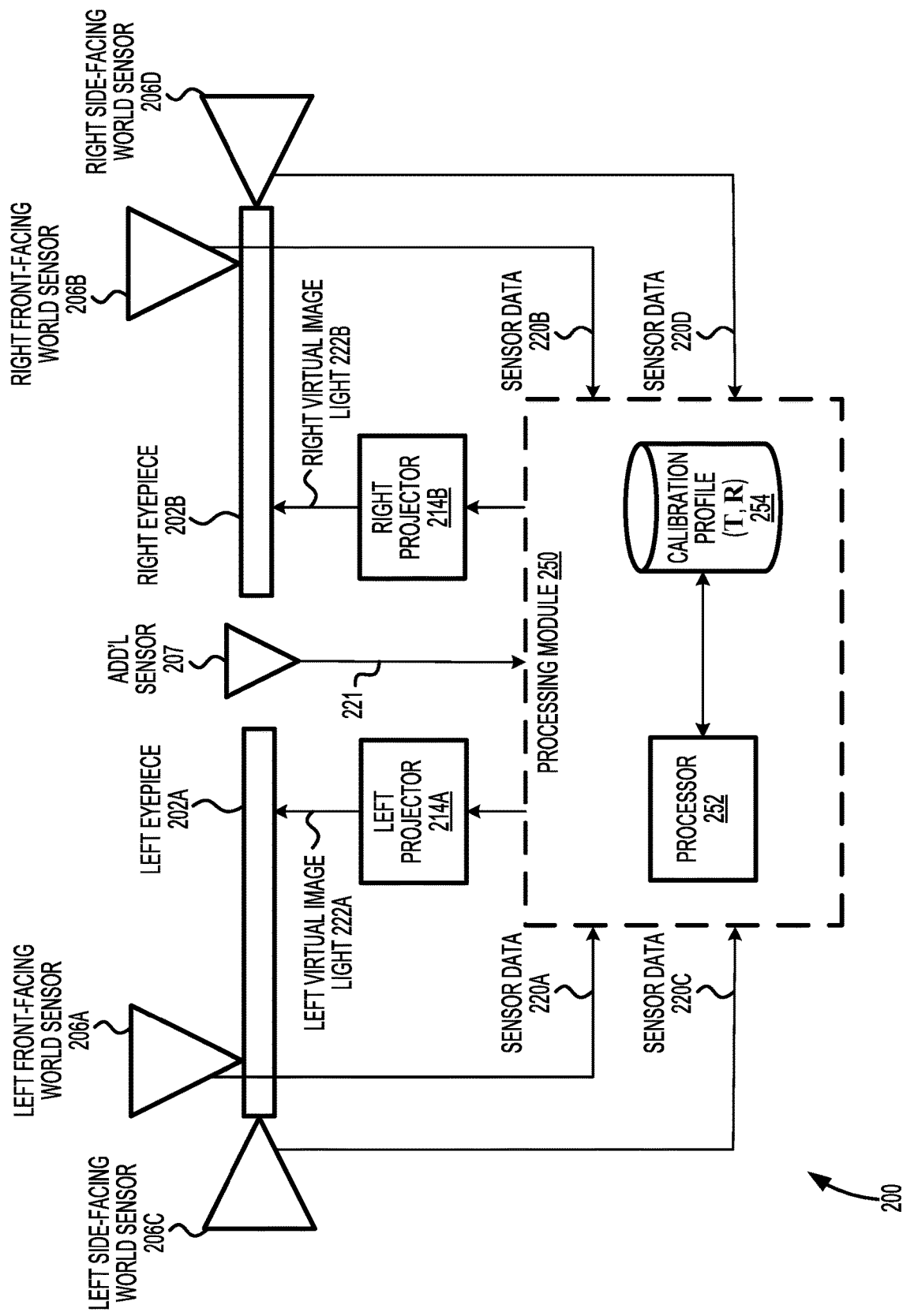
FIG. 2 is a block diagram illustrating a wearable AR device, according to some embodiments of the present invention.

FIG. 2 illustrates a schematic view of a wearable AR device 200, according to some embodiments of the present invention. AR device 200 may include a left eyepiece 202A as part of a left optical stack and a right eyepiece 202B as part of a right optical stack. In some embodiments, AR device 200 includes one or more sensors including, but not limited to: a left front-facing world sensor 206A attached directly to or near left eyepiece 202A, a right front-facing world sensor 206B attached directly to or near right eyepiece 202B, a left side-facing world sensor 206C attached directly to or near left eyepiece 202A, and a right side-facing world sensor 206D attached directly to or near right eyepiece 202B. The positions of one or more of sensors 206 may vary from the illustrated embodiment, and may include various backward-, forward-, upward-, downward-, inward-, and/or outward-facing configurations. Sensors 206A, 206B, 206C, 206D may be configured to generate, detect, and/or capture sensor data 220A, 220B, 220C, 220D, respectively, which may be electronic data corresponding to a physical property of the environment surrounding AR device 200, such as motion, light, temperature, sound, humidity, vibration, pressure, and the like.

In some embodiments, one or more of sensors 206 may be cameras and one or more of sensor data 220 may be camera images. For example, sensor data 220 may include a single image, a pair of images, a video comprising a stream of images, a video comprising a stream of paired images, and the like. In some embodiments, one or more of sensors 206 may be depth sensors and one or more of sensor data 220 may be depth images/maps. For example, one of sensors 206 may include a time-of-flight imaging system configured to transmit light pulses to illuminate target objects and to determine distances to the target objects based on received optical signals. One example of such a system is described in reference to U.S. patent application Ser. No. 15/721,640 titled "REAL TIME CALIBRATION FOR TIME-OF-FLIGHT DEPTH MEASUREMENT" filed on Sep. 29, 2017, the entire disclosure of which is hereby incorporated by reference, for all purposes, as if fully set forth herein. Additional examples of sensors 206 may include any type of motion sensor, depth sensor, light sensor, mechanical sensor, temperature sensor, sound sensor, humidity sensor, vibration sensor, pressure sensor, and the like.

AR device 200 may include an additional sensor 207 separate from sensors 206. Additional sensor 207 may be configured to generate, detect, and/or capture additional sensor data 221. Additional sensor 207 may be any type of sensor described above in reference to sensors 206 and additional sensor data 221 may be any type of sensor data described above in reference to sensor data 220. In some embodiments, additional sensor data 221 is used to determine a calibration level associated with sensors 206 (i.e., associated with calibration profile 254), as is described in further detail below. In one example, additional sensor 207 is a strain gauge positioned over a portion of AR device 200 (e.g., extending between two of sensors 206) for determining the strain to AR device 200. In another example, additional sensor 207 is a mechanical sensor positioned along the frame of AR device 200 (e.g., at a center point between eyepieces 202) for measuring the bend, angle, torsion, etc., of a portion of the frame of AR device 200. Further examples of additional sensor 207 are provided in U.S. Provisional Patent Application No. 62/698,015 filed Jul. 13, 2018, titled "SYSTEMS AND METHODS FOR DISPLAY BINOCULAR DEFORMATION COMPENSATION", the entire disclosure of which is hereby incorporated by reference, for all purposes, as if fully set forth herein.

In some embodiments, AR device 200 includes one or more image projection devices such as a left projector 214A that is optically linked to left eyepiece 202A and a right projector 214B that is optically linked to right eyepiece 202B. Projectors 214 may inject light associated with virtual content onto one or more waveguides of eyepieces 202 in a manner that a user perceives virtual content as being positioned at a particular distance. Eyepieces 202A, 202B may comprise transparent or semi-transparent waveguides configured to direct and outcouple light received from projectors 214A, 214B, respectively. During operation, a processing module 250 may cause left projector 214A to output left virtual image light 222A onto left eyepiece 202A, and may cause right projector 214B to output right virtual image light 222B onto right eyepiece 202B. In some embodiments, each of eyepieces 202 may comprise a plurality of waveguides corresponding to different colors and/or different depth planes.

Some or all of the components of AR device 200 may be head mounted such that projected images may be viewed by a user. In one particular implementation, all of the components of AR device 200 shown in FIG. 2 are mounted onto a single device (e.g., a single headset) wearable by a user. In another implementation, one or more components of a processing module 250 are physically separate from and communicatively coupled to the other components of AR device 200 by one or more wired and/or wireless connections. For example, processing module 250 may include a local module on the head mounted portion of AR device 200 and a remote module physically separate from and communicatively linked to the local module. The remote module may be mounted in a variety of configurations, such as fixedly attached to a frame, fixedly attached to a helmet or hat worn by a user, embedded in headphones, or otherwise removably attached to a user (e.g., in a backpack-style configuration, in a belt-coupling style configuration, etc.).

Processing module 250 may include a processor 252 and an associated digital memory, such as non-volatile memory (e.g., flash memory), both of which may be utilized to assist in the processing, caching, and storage of data, such as sensor data 220. For example, processing module 250 may receive left front image(s) (i.e., sensor data 220A) from a left front-facing camera (i.e., sensor 206A), right front image(s) (i.e., sensor data 220B) from a right front-facing world camera (i.e., sensor 206B), left side image(s) (i.e., sensor data 220C) from a left side-facing world camera (i.e., sensor 206C), and right side image(s) (i.e., sensor data 220D) from a right side-facing world camera (i.e., sensor 206D). Sensor data 220 may be periodically generated and sent to processing module 250 while AR device 200 is powered on, or may be generated in response to an instruction sent by processing module 250 to one or more of the cameras. As another example, processing module 250 may receive ambient light information (i.e., sensor data 220) from an ambient light sensor (i.e., sensor 206).

When implemented as cameras, sensors 206A, 206B may be positioned to capture images that substantially overlap with the field of view of a user's left and right eyes, respectively. Accordingly, placement of sensors 206 may be near a user's eyes, but not so near as to obscure the user's field of view. Alternatively or additionally, sensors 206A, 206B may be positioned so as to substantially align with the incoupling locations of virtual image light 222A, 222B, respectively. When implemented as cameras, sensors 206C, 206D may be positioned to capture images to the side of a user, e.g., in a user's peripheral vision or outside the user's peripheral vision. Images captured using sensors 206C, 206D need not necessarily overlap with images captured using sensors 206A, 206B.

During operation of AR device 200, processing module 250 may use one or more parameters from a calibration profile 254 to account for the spacing and orientation differences between sensors 206 so that sensor data 220 may be correctly analyzed. Calibration profile 254 may additionally be used when generating virtual image light 222 to account for the spacing and orientation differences between eyepieces 202 such that a user may view virtual image elements comfortably and in proper alignment. To accomplish this, processor 252 may repeatedly access calibration profile 254 to ensure that the parameters being used reflect the most updated and accurate parameters that are available. In some instances, processor 252 may retrieve parameters from calibration profile 254 immediately after a calibration process is performed. In one particular implementation, calibration profile 254 is stored in a non-volatile memory such that processor 252 may retrieve the last used parameters upon powering on AR device 200. Alternatively, it may be desirable to access a stored factory calibration at startup of AR device 200 when AR device 200 may not have significant deformation resulting from, for example, thermal expansion of the device caused by running onboard electronic components.

In some embodiments, calibration profile 254 is maintained by processor 252 to model a spatial relationship between a first sensor and a second sensor of sensors 206 (e.g., sensors 206A, 206B). According to some embodiments of the present invention, calibration profile 254 includes a translation parameter T corresponding to the relative distance between the first sensor and the second sensor, and a rotation parameter R corresponding to the relative angular orientation between the first sensor and the second sensor. Each of translation parameter T and rotation parameter R may take on a wide range of data types. For example, translation parameter T may be a single quantity (e.g., 0.1 meters), a one-dimensional matrix (e.g., [0.1; 0; 0] meters), a multi-dimensional matrix (e.g., [[0.1; 0; 0][0; 0; 0][0; 0; 0]] meters), an array, a vector, or any other possible representation of single or multiple quantities. Similarly, rotation parameter R may be a single quantity (e.g., 0.5 degrees), a one-dimensional matrix (e.g., [0.5; 0; 0] degrees), a multi-dimensional matrix (e.g., [[0.5; 0; 0][0; 0; 0][0; 0; 0]] degrees), an array, a vector, or any other possible representation of single or multiple quantities.

Under ideal conditions, translation parameter T and rotation parameter R are calibrated in the factory immediately after manufacture of AR device 200, and remain accurate indications of the spatial relationship between the first sensor and the second sensor throughout the life of the device. Under actual conditions, AR device 200 becomes deformed due to heat, use, and various forms of wear and tear, causing the factory calibrated values of translation parameter T and rotation parameter R to become inaccurate. One possible solution is for a user to repeatedly bring AR device 200 back to the factory for recalibration. Alternatively, a run-time calibration method may be employed for calibrating translation parameter T and rotation parameter R while AR device 200 is powered on and in use by a user.

In some instances, a calibration level associated with calibration profile 254 is periodically determined. Based on the calibration level, processing module 250 may cause one of several types of calibrations to occur. For example, when the calibration level is below a first calibration threshold, processing module 250 may cause a first calibration process to be performed, and when the calibration level is above the first calibration threshold, processing module 250 may cause a second calibration process to be performed. In some instances, neither calibration process may be performed when the calibration level is above the first calibration threshold and a second calibration threshold, indicating that calibration profile 254 is accurate. As used herein, the term "calibration level" may correspond to the level of accuracy of calibration profile 254 in modeling the actual spatial relationship between the first sensor and the second sensor (e.g., sensors 206A, 206B). Accordingly, higher calibration levels may correspond to a more accurate modeling of the actual spatial relationship and a lower calibration level may correspond to less accurate modeling of the actual spatial relationship. The process of monitoring a calibration level in connection with calibration of AR device 200 is described in further detail below.

Figure 3:
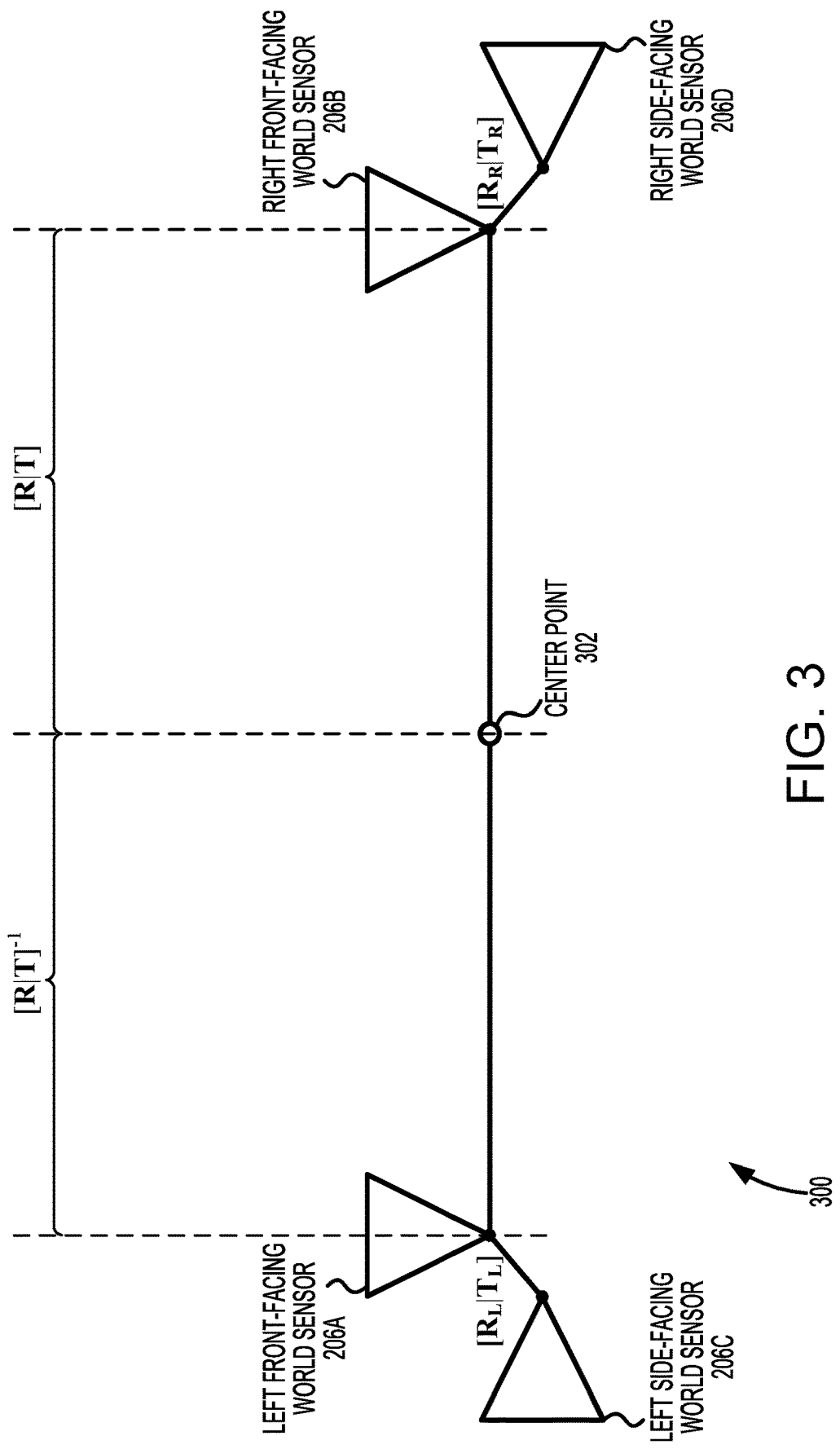
FIG. 3 illustrates a calibration model of an AR, according to some embodiments of the present invention.

FIG. 3 illustrates a calibration model 300 of AR device 200, according to some embodiments of the present invention. In calibration model 300, each of sensors 206 may be represented using the pinhole camera model as occupying a single point, with sensor 206C being offset from sensor 206A by a known translation and rotation (modeled by the transformation $[T_L|R_L]$) and sensor 206D being offset from sensor 206B by a known translation and rotation (modeled by the transformation $[T_R|R_R]$). A center point 302 between sensors 206A, 206B is used to track the position of AR device 200 in the environment with respect to a world origin and is also used as a baseline for translation and rotation adjustments. In some embodiments, the relative distance between each of sensors 206A, 206B and center point 302 may be equal to translation parameter T, where translation parameter T represents a 3×1 matrix corresponding to a three-dimensional (3D) vector (e.g., [0.1 0.2 0.1] meters). In some embodiments, the relative angular orientation between each of sensors 206A, 206B and center point 302 may be equal to rotation parameter R, where rotation parameter R represents a 3×3 matrix (referred to, in some embodiments, as a rotation vector). Accordingly, the transformation between sensor 206B and center point 302 may be modeled by the transformation [T|R] and the transformation between sensor 206A and center point 302 may be modeled by the transformation $[T|R]^{-1}$.

Figure 4A:
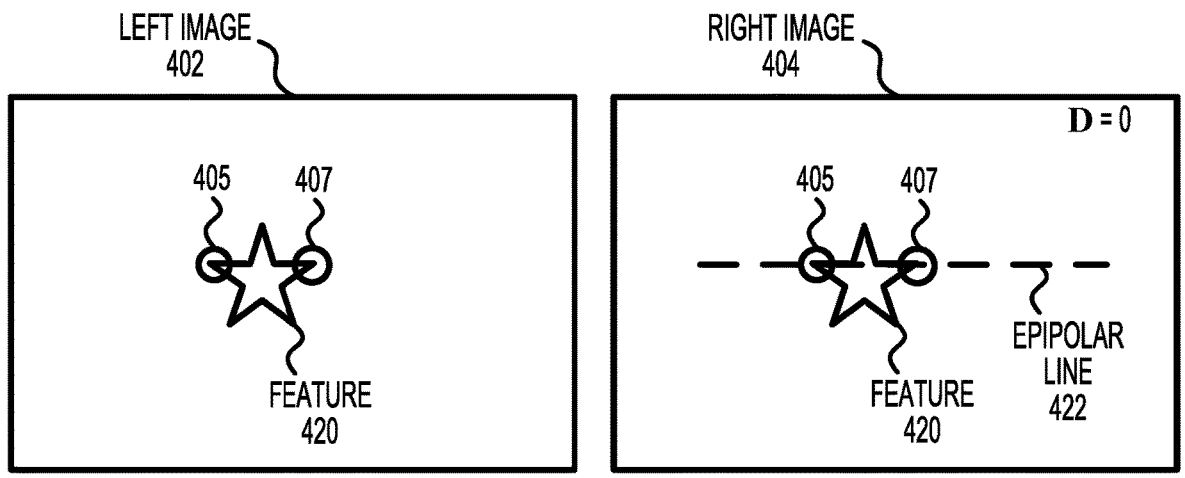
FIGS. 4A, 4B, and 4C illustrate various steps for determining a calibration level associated with a calibration profile, according to some embodiments of the present invention.
Figure 4B:
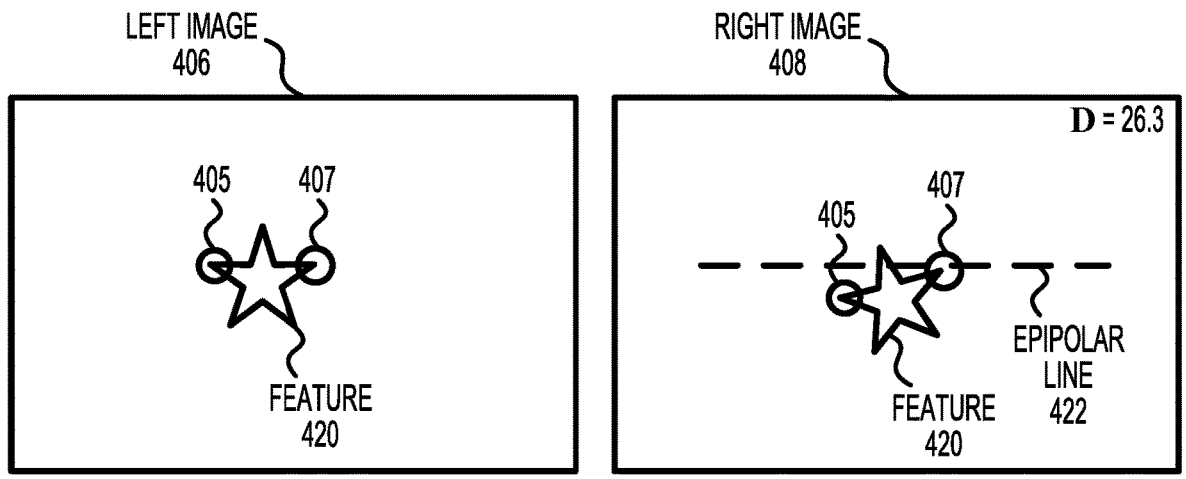
Figure 4C:
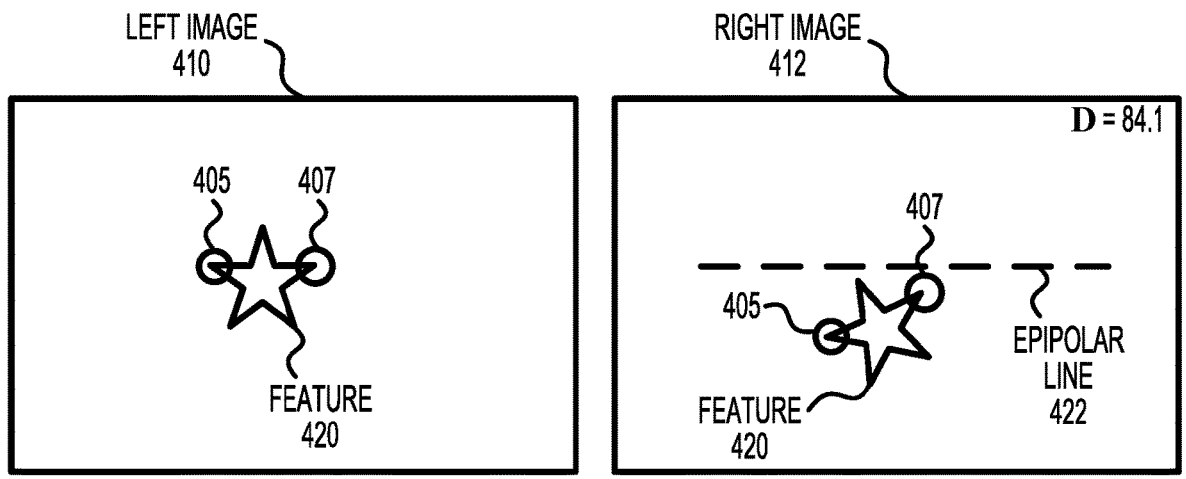

FIGS. 4A, 4B, and 4C illustrate various steps for determining a calibration level associated with calibration profile 254, according to some embodiments of the present invention.

In some embodiments, determining a calibration level associated with calibration profile 254 includes determining a deformation amount D of AR device 200 affecting the position and/or orientation of left front-facing world sensor 206A in relation to right front-facing world sensor 206B. Deformation amount D may be used as a calibration level and may be inversely proportional to the calibration level as described herein. For example, determining whether deformation amount D is greater than a deformation threshold may be tantamount to determining whether the calibration level is less than a calibration threshold. Similarly, determining whether deformation amount D is less than a deformation threshold may be tantamount to determining whether the calibration level is greater than a calibration threshold.

The steps described in reference to FIGS. 4A, 4B, and 4C may be performed on a per-frame basis or be performed every N-th frame. The steps may use epipolar geometry, which may require that a pair of corresponding "features" or "points of interest" be observable by each of sensors 206A, 206B. Deformation amount D may be determined prior to or during performance of methods 800, 900, 1000, 1100, described in reference to FIGS. 8, 9, 10, and 11.

In reference to FIG. 4A, a left image 402 captured by sensor 206A at time $t_1$ may be compared to a right image 404 captured by sensor 206B at time $t_1$ to identify at least one feature, either in its entirety or portions thereof, that appears in both images (using, for example, one or more feature matching techniques). After determining that both images 402, 404 include a feature 420 (a five-pointed star), an epipolar line 422 is generated based on left image 402 and is projected onto right image 404. Epipolar line 422 may be generated based on the vertical/horizontal positioning and/or orientation of feature 420 as appearing in left image 402, and may be projected onto right image 404 using the most updated version of calibration profile 254. Epipolar line 422 represents a line on which feature 420 is expected to lie from the perspective of sensor 206B if sensors 206A, 206B are perfectly aligned. Deviation in the position of feature 420 from epipolar line 422 indicates calibration error between sensors 206A, 206B and the magnitude of the deviation corresponds to more or less error.

In some embodiments, a first point 405 and a second point 407 are identified within feature 420 in each of images 402, 404 to facilitate determining the vertical/horizontal positioning and/or orientation of feature 420. In the example shown in FIG. 4A, left image 402 is analyzed to identify first point 405 along a top left point of feature 420 and second point 407 along a top right point of feature 420. Next, an intersecting line between first point 405 and second point 407 is formed in left image 402 and the intersecting line is transformed from left image 402 to right image 404 using calibration profile 254 to project epipolar line 422 onto right image 404. Once epipolar line 422 is projected onto right image 404, first point 405 and second point 407 within right image 404 and are compared to epipolar line 422. After comparing feature 420 (i.e., points 405 and 407) in right image 404 to epipolar line 422, deformation amount D (i.e., a calibration level) may be calculated based on the translation offset and the orientation offset between feature 420 and epipolar line 422. Because feature 420 in the example illustrated in FIG. 4A is aligned well with epipolar line 422, deformation amount D is determined to be low (e.g., equal to 0). Additional features may be analyzed to determine deformation amount D with a higher degree of accuracy. In some embodiments, deformation amount D is expressed in pixels and may, in some embodiments, be equal to the number of pixels separating feature 420 and epipolar line 422. In some embodiments, deformation amount D is referred to as the reprojection error.

In reference to FIG. 4B, a left image 406 captured by sensor 206A at time $t_2$ may be compared to a right image 408 captured by sensor 206B at time $t_2$ to identify feature 420 appearing in both images. Images 406, 408 are analyzed to identify points 405, 407 within feature 420 in each of images 406, 408. Next, an intersecting line between points 405, 407 is formed in left image 406 and the intersecting line is transformed from left image 406 to right image 408 using the latest updated version of calibration profile 254 to project epipolar line 422 onto right image 408. Points 405, 407 within right image 408 are then compared to epipolar line 422 to determine deformation amount D. Because feature 420 is not aligned with epipolar line 422 (the translation offset and the orientation offset are significant as shown by the misalignment between points 405 and 407 and epipolar line 422), deformation amount D is determined to be higher than the example shown in FIG. 4A (e.g., equal to 26.3).

In reference to FIG. 4C, a left image 410 captured by sensor 206A at time $t_3$ may be compared to a right image 412 captured by sensor 206B at time $t_3$ to identify feature 420 appearing in both images. Images 410, 412 are analyzed to identify points 405, 407 within feature 420 in each of images 410, 412. Next, an intersecting line between points 405, 407 is formed in left image 410 and the intersecting line is transformed from left image 410 to right image 412 using the latest updated version of calibration profile 254 to project epipolar line 422 onto right image 412. Points 405, 407 within right image 412 are then compared to epipolar line 422 to determine deformation amount D. Because feature 420 is significantly offset with epipolar line 422 (the translation offset and the orientation offset are significant as shown by the misalignment between points 405 and 407 and epipolar line 422), deformation amount D is determined to be higher than the examples shown in FIGS. 4A and 4B (e.g., equal to 84.1).

Figure 5A:
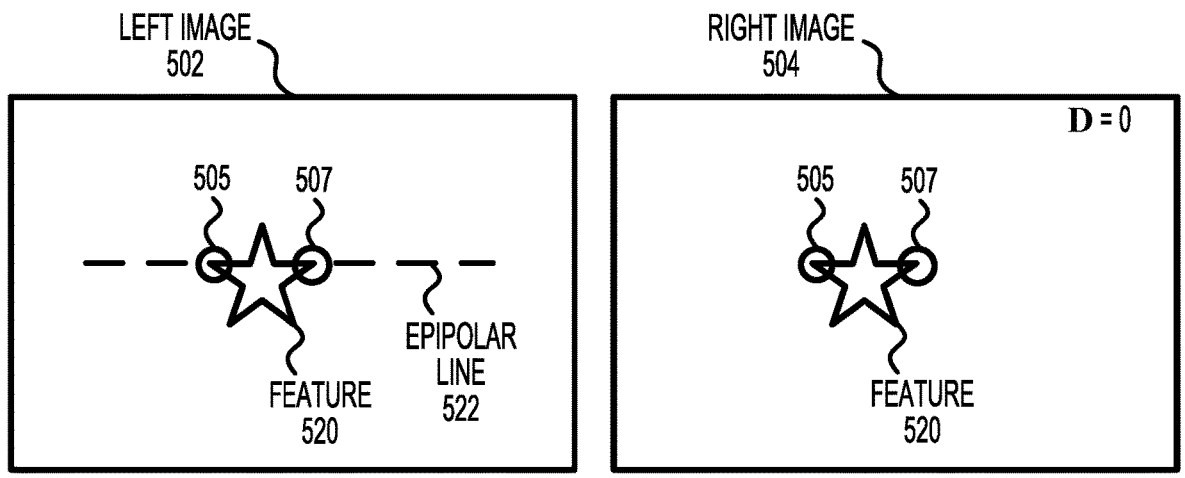
FIGS. 5A, 5B, and 5C illustrate various steps for determining a calibration level associated with a calibration profile, according to some embodiments of the present invention.
Figure 5B:
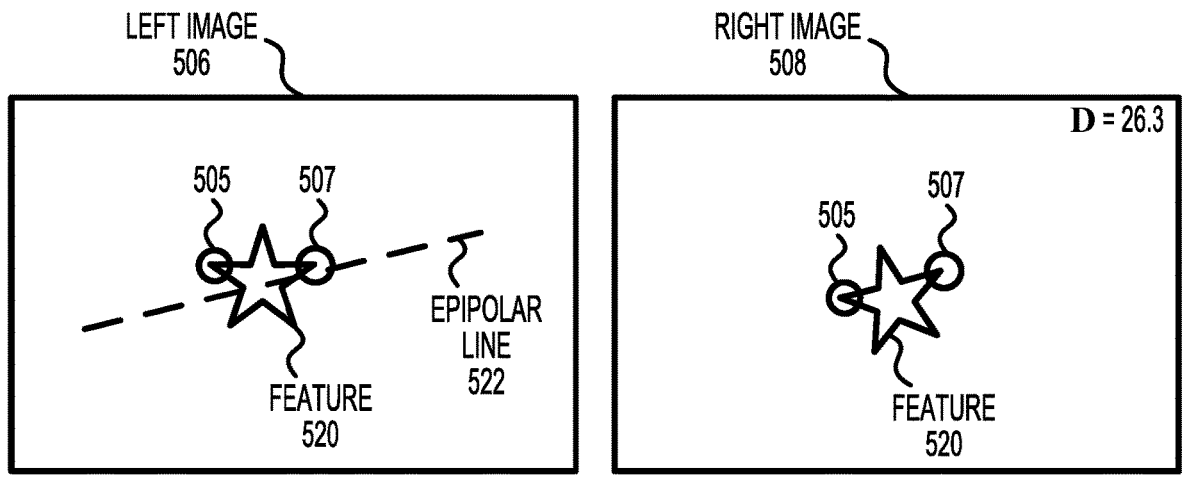
Figure 5C:
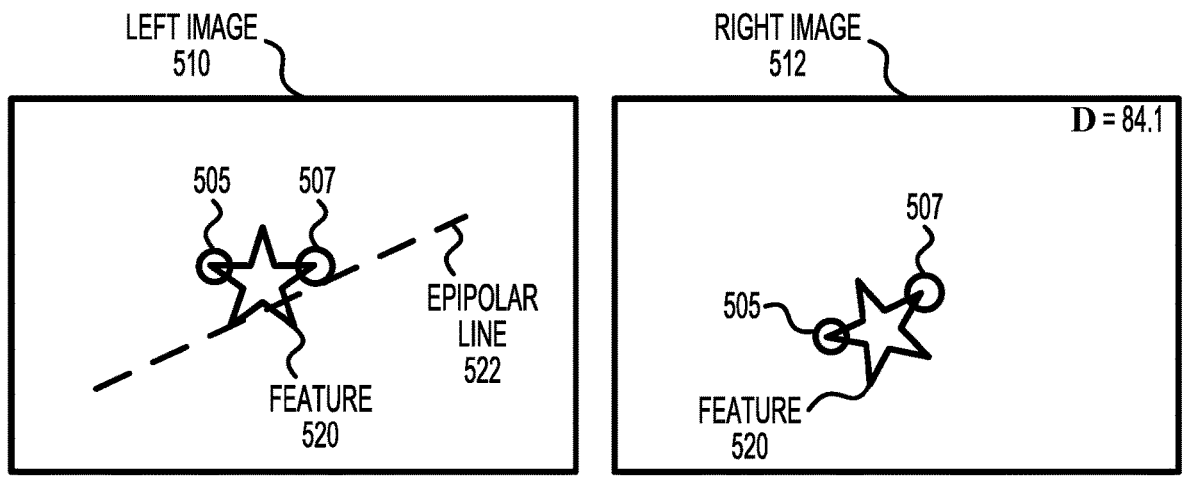

FIGS. 5A, 5B, and 5C illustrate various steps for determining a calibration level associated with calibration profile 254, according to some embodiments of the present invention. The examples illustrated in FIGS. 5A, 5B, and 5C correspond to the examples illustrated in FIGS. 4A, 4B, and 4C, respectively, and demonstrate an alternative approach of projecting the right image onto the left image to calculate an identical deformation amount D (i.e., calibration level). The steps described in reference to FIGS. 5A, 5B, and 5C may be performed on a per-frame basis or be performed every N-th frame.

In reference to FIG. 5A, a left image 502 captured by sensor 206A at time $t_1$ may be compared to a right image 504 captured by sensor 206B at time $t_1$ to identify feature 520 appearing in both images. Images 502, 504 are analyzed to identify points 505, 507 within feature 520 in each of images 502, 504. Next, an intersecting line between points 505, 507 is formed in right image 504 and the intersecting line is transformed from right image 504 to left image 502 using the latest updated version of calibration profile 254 to project epipolar line 522 onto left image 502. Points 505, 507 within left image 502 are then compared to epipolar line 522 to determine deformation amount D. Because feature 520 in the example illustrated in FIG. 5A is aligned well with epipolar line 522, deformation amount D is determined to be low (e.g., equal to 0).

In reference to FIG. 5B, a left image 506 captured by sensor 206A at time $t_2$ may be compared to a right image 508 captured by sensor 206B at time $t_2$ to identify feature 520 appearing in both images. Images 506, 508 are analyzed to identify points 505, 507 within feature 520 in each of images 506, 508. Next, an intersecting line between points 505, 507 is formed in right image 508 and the intersecting line is transformed from right image 508 to left image 506 using the latest updated version of calibration profile 254 to project epipolar line 522 onto left image 506. Points 505, 507 within left image 506 are then compared to epipolar line 522 to determine deformation amount D. Because feature 520 is not aligned with epipolar line 522 (the translation offset and the orientation offset are significant as shown by the misalignment between points 505 and 507 and epipolar line 522), deformation amount D is determined to be higher than the example shown in FIG. 5A (e.g., equal to 26.3).

In reference to FIG. 5C, a left image 510 captured by sensor 206A at time $t_3$ may be compared to a right image 512 captured by sensor 206B at time $t_3$ to identify feature 520 appearing in both images. Images 510, 512 are analyzed to identify points 505, 507 within feature 520 in each of images 510, 512. Next, an intersecting line between points 505, 507 is formed in right image 512 and the intersecting line is transformed from right image 512 to left image 510 using the latest updated version of calibration profile 254 to project epipolar line 522 onto left image 510. Points 505, 507 within left image 510 are then compared to epipolar line 522 to determine deformation amount D. Because feature 520 is significantly offset with epipolar line 522 (the translation offset and the orientation offset are significant as shown by the misalignment between points 505 and 507 and epipolar line 522), deformation amount D is determined to be higher than the examples shown in FIGS. 5A and 5B (e.g., equal to 84.1).

Figure 6:
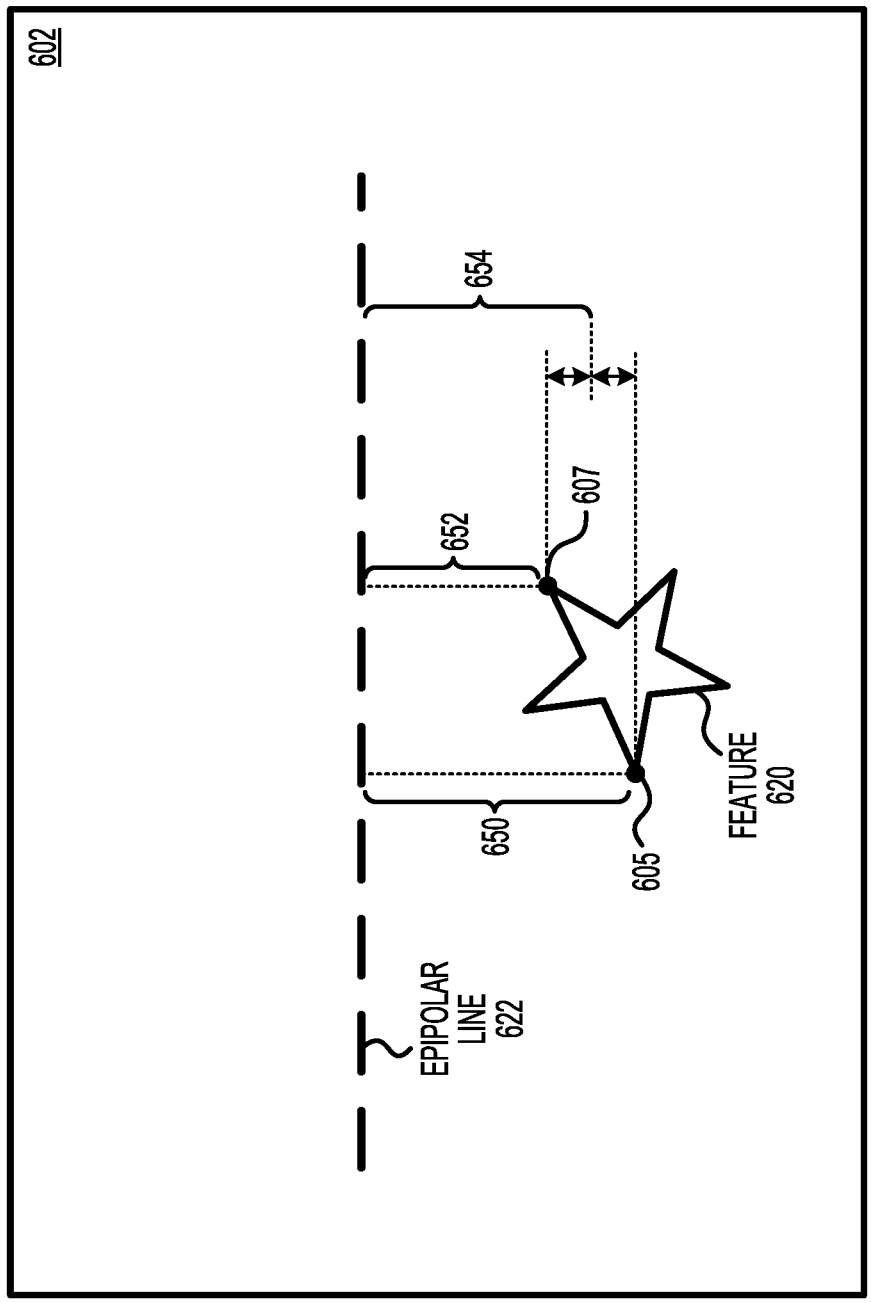
FIG. 6 illustrates an example calculation of a deformation amount based on two images, according to some embodiments of the present invention.

FIG. 6 illustrates an example calculation of deformation amount D (i.e., calibration level) based on two images having a common feature appearing in both images, according to some embodiments of the present invention. First, feature 620 having points 605, 607 is identified in both a first image 602 and a second image (not shown). First image 602 may represent a left image or a right image, among other possibilities. An intersecting line between points 605, 607 is formed in the second image and is transformed from the second image to first image 602 using the latest updated version of calibration profile 254 to project epipolar line 622 onto first image 602 (as is shown in reference to FIGS. 4A, 4B, 4C, 5A, 5B, and 5C). Points 605, 607 within first image 602 are then compared to epipolar line 622 to determine deformation amount D.

In some embodiments, a first offset 650 is calculated as a vertical distance between point 605 and epipolar line 622 and/or a second offset 652 is calculated as a vertical distance between point 607 and epipolar line 622. The calculated value of deformation amount D may be equal to or related to (e.g., a scaled version of) first offset 650, second offset 652, an average offset 654 between first offset 650 and second offset 652, a minimum or maximum of first offset 650 and second offset 652, a ratio between first offset 650 and second offset 652 (e.g., first offset 650 divided by second offset 652, second offset 652 divided by first offset 650, etc.), a difference between first offset 650 and second offset 652 (e.g., first offset 650 subtracted from second offset 652 or second offset 652 subtracted from first offset 650, etc.), among other possibilities.

Figure 7:
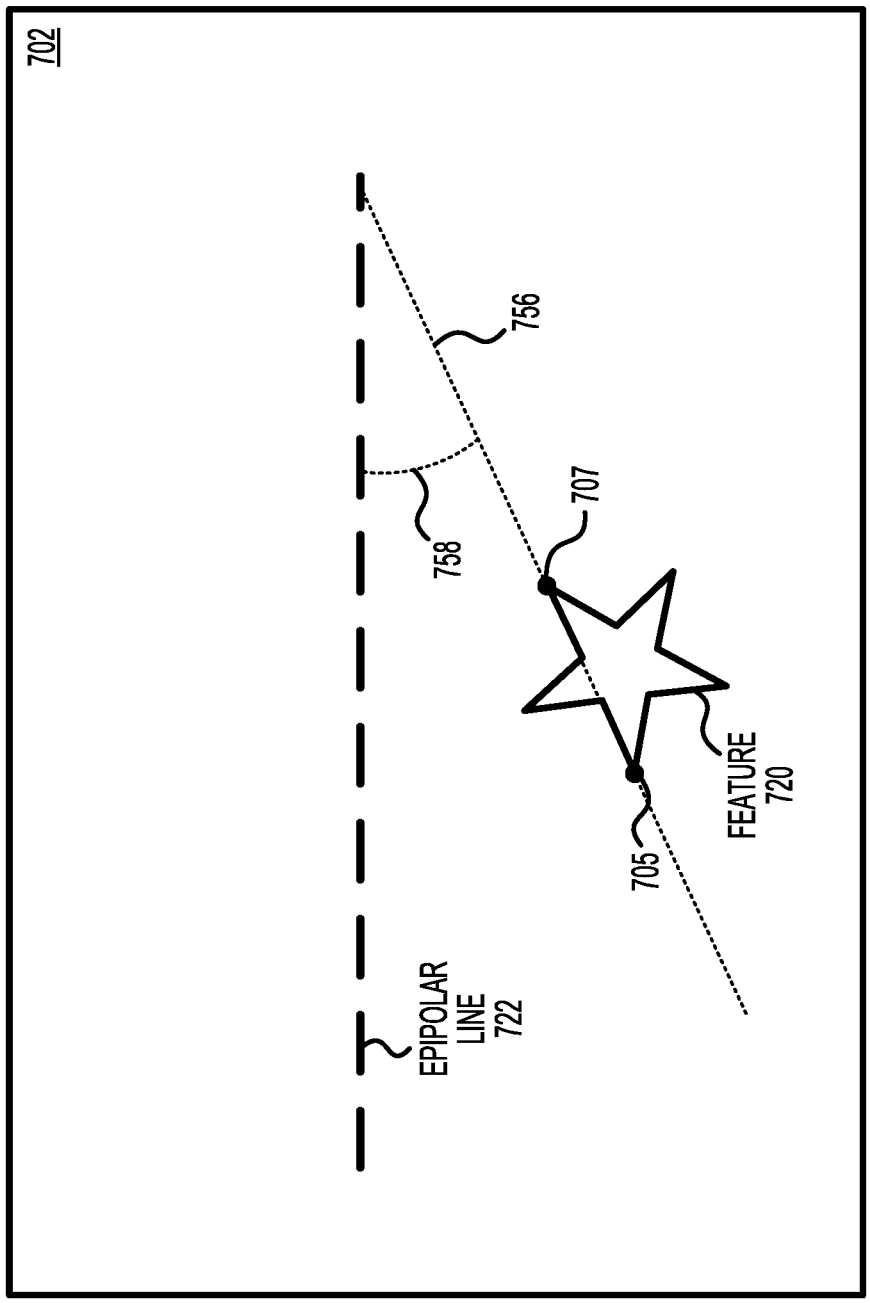
FIG. 7 illustrates an example calculation of a deformation amount based on two images, according to some embodiments of the present invention.

FIG. 7 illustrates an example calculation of deformation amount D (i.e., calibration level) based on two images having a common feature appearing in both images, according to some embodiments of the present invention. First, feature 720 having points 705, 707 is identified in both a first image 702 and a second image (not shown). First image 702 may represent a left image or a right image, among other possibilities. An intersecting line between points 705, 707 is formed in the second image and is transformed from the second image to first image 702 using the latest updated version of calibration profile 254 to project epipolar line 722 onto first image 702 (as is shown in reference to FIGS. 4A, 4B, 4C, 5A, 5B, and 5C). Points 705, 707 within first image 702 are then compared to epipolar line 722 to determine deformation amount D.

In some embodiments, a line 756 intersecting points 705, 707 is formed in first image 702 and an angle 758 between line 756 and epipolar line 722 is calculated. Angle 758 may alternatively or additionally be calculated by determining vertical offsets between points 705, 707 and epipolar line 722 (similar to first offset 650 and second offset 652 described in reference to FIG. 6) and a horizontal offset between points 705, 707, and using trigonometry to solve for angle 758. The calculated value of deformation amount D may be equal to or related to (e.g., a scaled version of) angle 758, the sine (function) of angle 758, the tangent (function) of angle 758, the inverse of angle 758, among other possibilities.

In some embodiments, the deformation amount calculated in reference to FIG. 6 is a translation deformation amount $D_T$ and the deformation amount calculated in reference to FIG. 7 is a rotation deformation amount $D_R$. In some embodiments, the calculated value of deformation amount D may be equal to or related to (e.g., a scaled version of) the sum of translation deformation amount $D_T$ and rotation deformation amount $D_R$, an average between translation deformation amount $D_T$ and rotation deformation amount $D_R$, a minimum or maximum of translation deformation amount $D_T$ and rotation deformation amount $D_R$, a ratio between translation deformation amount $D_T$ and rotation deformation amount $D_R$ (e.g., translation deformation amount $D_T$ divided by rotation deformation amount $D_R$, rotation deformation amount $D_R$ divided by translation deformation amount $D_T$, etc.), a difference between translation deformation amount $D_T$ and rotation deformation amount $D_R$ (e.g., translation deformation amount $D_T$ subtracted from rotation deformation amount $D_R$ or rotation deformation amount $D_R$ subtracted from translation deformation amount $D_T$, etc.), among other possibilities.

Figure 8:
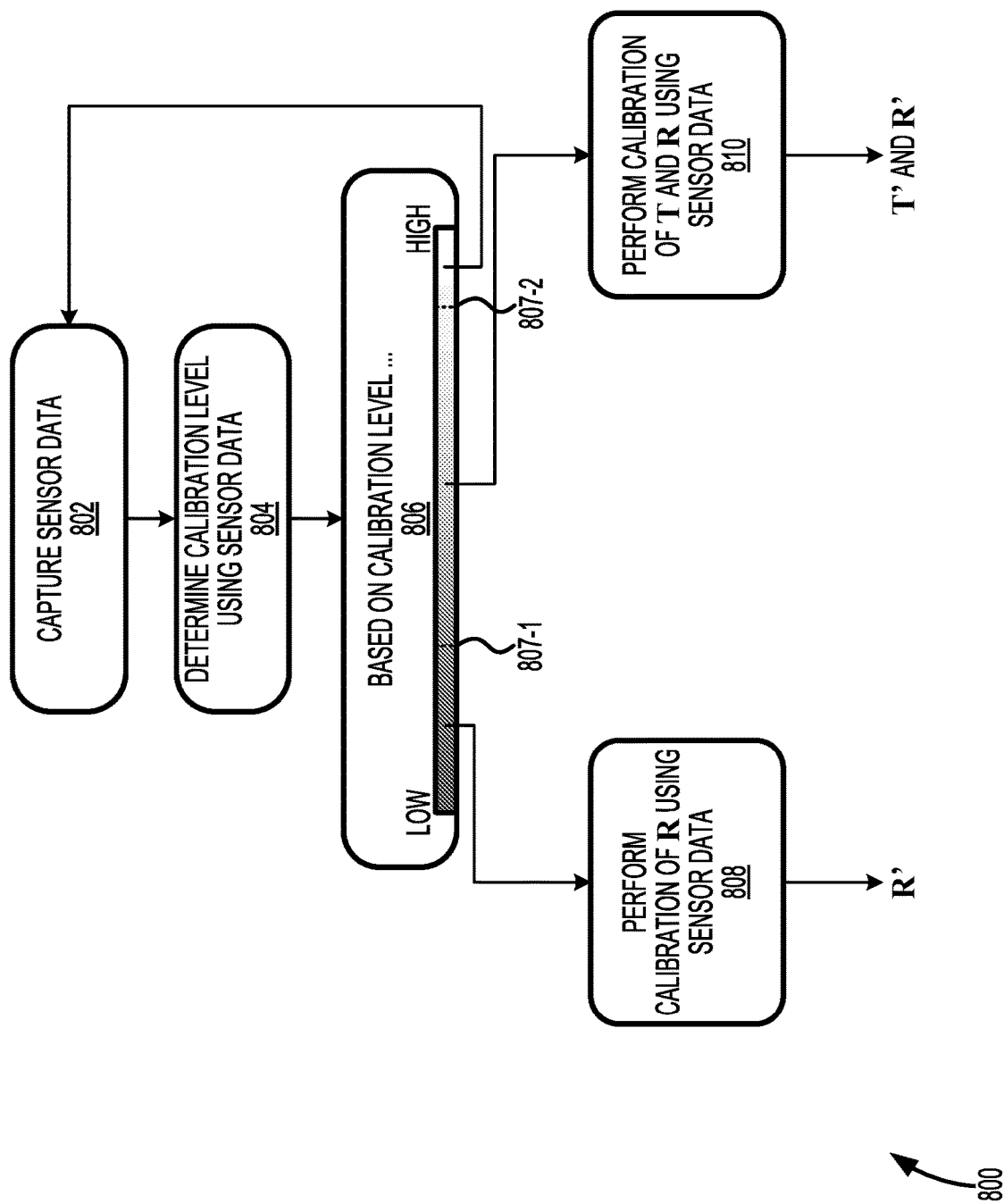
FIG. 8 illustrates a method for calibrating an AR device, according to some embodiments of the present invention.

FIG. 8 illustrates a method 800 for calibrating AR device 200, according to some embodiments of the present invention. Performance of method 800 may include performing more or fewer steps than those shown in FIG. 8, and steps of method 800 need not be performed in the order shown. Although method 800 is described in reference to calibrating an AR device, the method may be used to calibrate any device having two sensors whose spatial relationship is modeled by a calibration profile having a translation parameter and a rotation parameter.

In some embodiments, method 800 begins at block 802 in which sensor data 220 is captured by sensors 206. In some embodiments, sensor data 220 may be captured by a first sensor and a second sensor of sensors 206. For example, sensor data 220 may include one or more first images captured by the first sensor and one or more second images captured by the second sensor. In some embodiments, both the first images and the second images are camera images. In some embodiments, both the first images and the second images are depth images (i.e., depth maps). In some embodiments, the first images are camera images and the second images are depth images. In some embodiments, the first images are depth images and the second images are camera images. After sensor data 220 is captured by sensors 206, sensor data 220 may be sent to processing module 250.

At block 804, a calibration level associated with calibration profile 254 is determined. In some embodiments, the calibration level is determined based on sensor data 220, e.g., by analyzing one or both of the one or more first images and the one or more second images. For example, the one or more first images may be compared to the one or more second images and the calibration level may be determined based on the comparison. As another example, a deformation amount D of the first sensor in relation to the second sensor may be determined based on the comparison, and deformation amount D may be used as the calibration level (higher deformation amounts corresponding to lower levels of reliability). In some embodiments, the calibration level is determined by performing the steps described in reference to FIGS. 4A, 4B, and 4C and/or FIGS. 5A, 5B, and 5C. In some embodiments, block 804 is performed by processing module 250.

In some embodiments, determining the calibration level includes determining whether a head pose algorithm associated with AR device 200 is currently available and/or is currently generating accurate data. In some embodiments, the head pose algorithm may be used to generate map points (3D points) from sensor data 220 captured by sensors 206. For example, the head pose algorithm may receive a pair of images and generate map points by processing the pair of images. If AR device 200 becomes too deformed, the head pose algorithm will either be unable to converge or will be unable to generate accurate map points. In either case, the head pose algorithm may be considered to be "unavailable". In some embodiments, the calibration level may be associated with whether the head pose algorithm is available by, for example, having a first value (e.g., 1) when available and a second value (e.g., 0) when unavailable or, in some embodiments, having a value therebetween indicating a level of availability (e.g., 0.5).

At block 806, it is determined whether to perform a first calibration process, a second calibration process, or neither based on the calibration level. For example, the calibration level may have a single value that may be compared to one or more calibration thresholds. In some instances, the calibration level may be normalized to have a value between 0 and 1. In one example, the calibration level may be compared to a first calibration threshold 807-1 to determine whether the first calibration process or the second calibration process is to be performed. It may be determined to perform the first calibration process when the calibration level is above first calibration threshold 807-1 and to perform the second calibration process when the calibration level is below first calibration threshold 807-1, or vice-versa. In some embodiments, it may be determined to perform neither calibration process when the calibration level is above a second calibration threshold 807-2, which may be higher than first calibration threshold 807-1. Alternatively or additionally, it may be determined whether the calibration level is within a range of values, whether the calibration level is included in a list of values, whether the calibration level is greater than or less than a previously determined the calibration level by some threshold amount, whether the calibration level is less than a threshold for a particular amount of time (e.g., 250 milliseconds), or the like. In some embodiments, block 806 is performed by processing module 250.

In another example in which deformation amount D is used as the calibration level, deformation amount D may be compared to a first deformation threshold to determine whether the first calibration process or the second calibration process is to be performed. It may be determined to perform the first calibration process when deformation amount D is below the first deformation threshold and to perform the second calibration process when deformation amount D is above the first deformation threshold, or vice-versa. In some embodiments, it may be determined to perform neither calibration process when deformation amount D is below a second deformation threshold, which may be lower than the first deformation threshold. Alternatively or additionally, it may be determined whether deformation amount D is within a range of values, whether deformation amount D is included in a list of values, whether deformation amount D is greater than or less than a previously determined deformation amount D by some threshold amount, whether deformation amount D is greater than a threshold for a particular amount of time (e.g., 250 milliseconds), or the like.

If it is determined at block 806 that the first calibration process is to be performed, e.g., the calibration level is less than first calibration threshold 807-1, method 800 proceeds to block 808. At block 808, a first calibration process is performed which includes calibrating rotation parameter R while translation parameter T is not modified, i.e., only rotation parameter R is calibrated. Performing the first calibration process may include generating a calibrated rotation parameter R' to be used for replacing and/or updating rotation parameter R. In some embodiments, the first calibration process is performed using sensor data 220. The first calibration process may include minimizing an error equation in which translation parameter T is held constant (to its most current value) and rotation parameter R is varied (e.g., fluctuated) over a range of possible values. The value of rotation parameter R for which the error equation is minimized is set as calibrated rotation parameter R'. In some embodiments, block 808 is performed by processing module 250.

If it is determined at block 806 that the second calibration process is to be performed, e.g., the calibration level is greater than first calibration threshold 807-1 (but less than second calibration threshold 807-2), method 800 proceeds to block 810. At block 810, a second calibration process is performed which includes calibrating both translation parameter T and rotation parameter R, which may include generating a calibrated translation parameter T' and a calibrated rotation parameter R' to be used for replacing and/or updating translation parameter T and rotation parameter R, respectively. The second calibration process may include minimizing an error equation in which both translation parameter T and rotation parameter R are varied over a range of possible values. The values of translation parameter T and rotation parameter R for which the error equation is minimized are set as calibrated translation parameter T' and calibrated rotation parameter R', respectively. In some embodiments, block 810 is performed by processing module 250.

Figure 9:
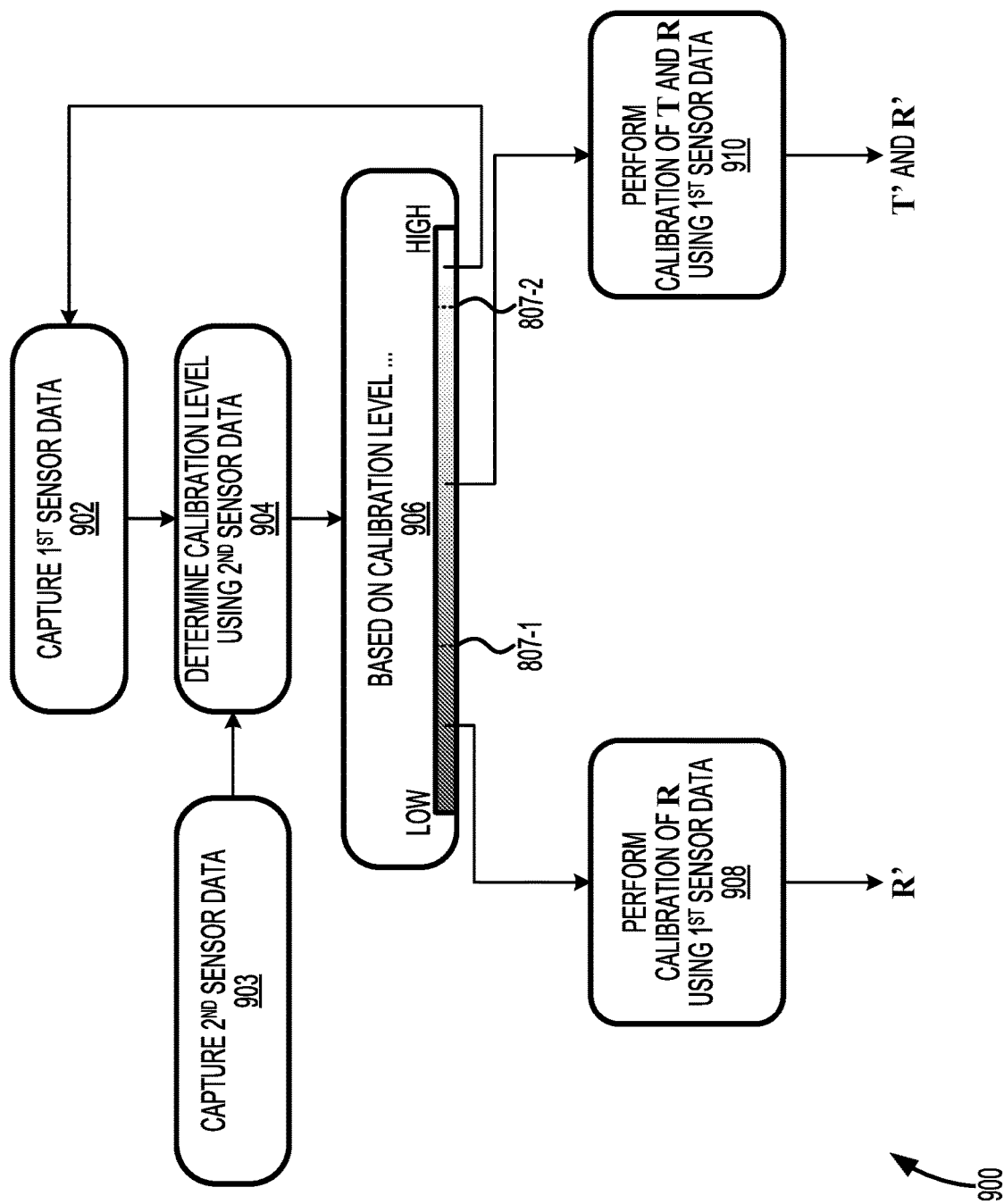
FIG. 9 illustrates a method for calibrating an AR device, according to some embodiments of the present invention.

FIG. 9 illustrates a method 900 for calibrating AR device 200, according to some embodiments of the present invention. Performance of method 900 may include performing more or fewer steps than those shown in FIG. 9, and steps of method 900 need not be performed in the order shown. One or more steps of method 900 may correspond to one or more steps of method 800. Although method 900 is described in reference to calibrating an AR device, the method may be used to calibrate any device having two sensors whose spatial relationship is modeled by a calibration profile having a translation parameter and a rotation parameter.

In some embodiments, method 900 begins at block 902 in which sensor data 220 (i.e., first sensor data) is captured by sensors 206. Block 902 may include one or more steps described in reference to block 802.

At block 903, additional sensor data 221 (i.e., second sensor data) is captured by additional sensor 207. Additional sensor 207 may be a separate sensor from sensors 206. In one example, additional sensor 207 is a strain gauge positioned over a portion of AR device 200 (e.g., extending between two of sensors 206) for determining the strain to AR device 200.

At block 904, a calibration level associated with calibration profile 254 is determined based on additional sensor data 221 (i.e., second sensor data). In some embodiments, the calibration level is determined by analyzing one or more images of additional sensor data 221. Block 904 may include one or more steps described in reference to block 804. In some embodiments, block 904 is performed by processing module 250.

At block 906, it is determined whether to perform a first calibration process, a second calibration process, or neither based on the calibration level. Block 906 may include one or more steps described in reference to block 806. In some embodiments, block 906 is performed by processing module 250.

If it is determined at block 906 that the first calibration process is to be performed, method 900 proceeds to block 908. At block 808, a first calibration process is performed which includes calibrating rotation parameter R using sensor data 220 (i.e., first sensor data) while translation parameter T is not modified. Block 908 may include one or more steps described in reference to block 808. In some embodiments, block 908 is performed by processing module 250.

If it is determined at block 906 that the second calibration process is to be performed, method 900 proceeds to block 910. At block 910, a second calibration process is performed which includes calibrating both translation parameter T and rotation parameter R using sensor data 220 (i.e., first sensor data). Block 910 may include one or more steps described in reference to block 810. In some embodiments, block 910 is performed by processing module 250.

Figure 10:
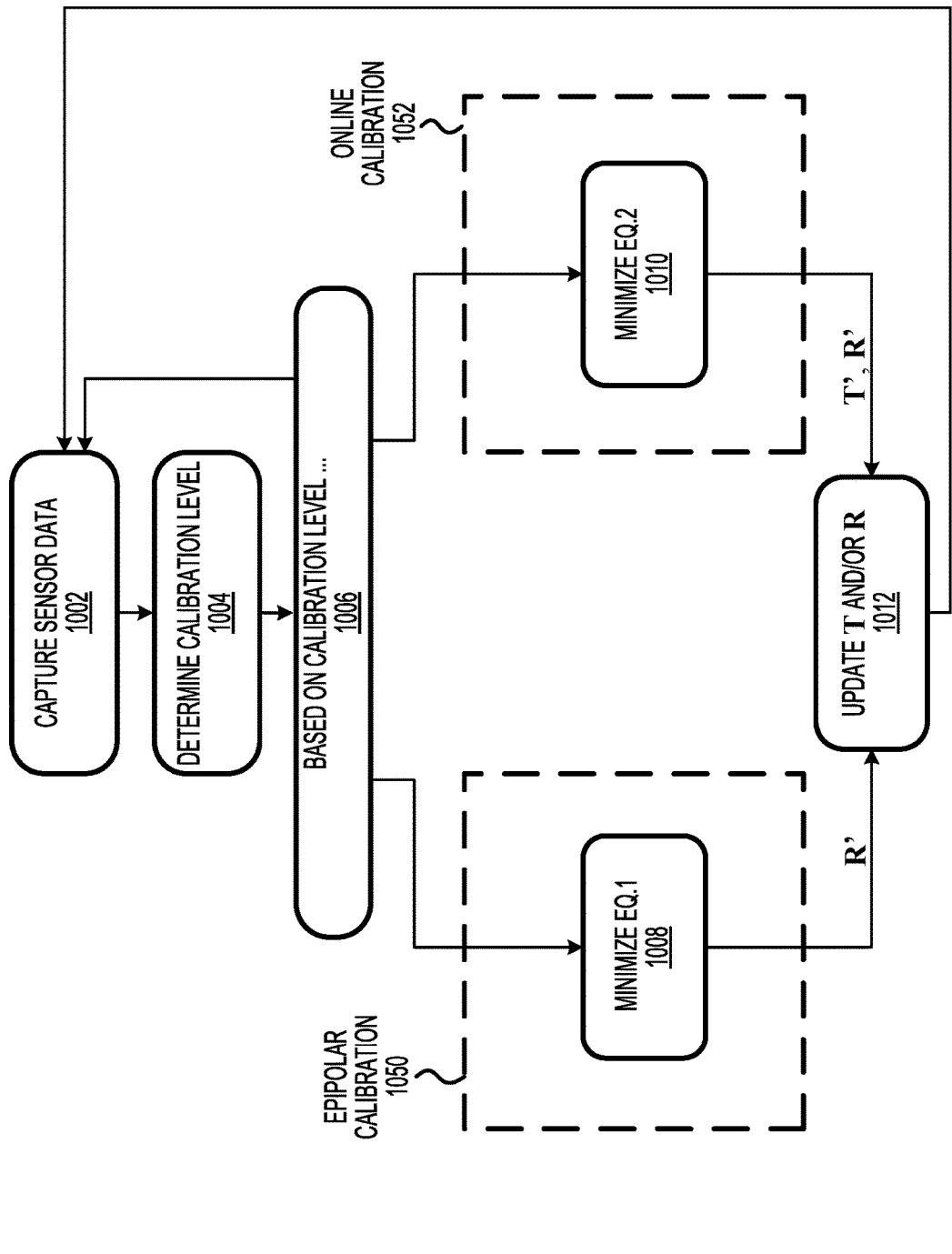
FIG. 10 illustrates a method for calibrating an AR device, according to some embodiments of the present invention.

FIG. 10 illustrates a method 1000 for calibrating AR device 200, according to some embodiments of the present invention. Performance of method 1000 may include performing more or fewer steps than those shown in FIG. 10, and steps of method 1000 need not be performed in the order shown. One or more steps of method 1000 may correspond to one or more steps of methods 800, 900. For example, method 1000 may comprise an epipolar calibration 1050 which may correspond to one or more steps described in reference to block 808, and an online calibration 1052 which may correspond to one or more steps described in reference to block 810. Although method 1000 is described in reference to calibrating an AR device, the method may be used to calibrate any device having two sensors whose spatial relationship is modeled by a calibration profile having a translation parameter and a rotation parameter.

In some embodiments, method 1000 begins at block 1002 in which sensor data 220 is captured by sensors 206. Block 1002 may include one or more steps described in reference to block 802.

At block 1004, a calibration level associated with calibration profile 254 is determined. Block 1004 may include one or more steps described in reference to blocks 804, 904. In some embodiments, block 1004 is performed by processing module 250.

At block 1006, it is determined whether to perform a first calibration process, a second calibration process, or neither based on the calibration level. Block 1006 may include one or more steps described in reference to block 806. In some embodiments, block 1006 is performed by processing module 250.

If it is determined at block 1006 that the first calibration process is to be performed, method 1000 proceeds to block 1008. At block 1008, a first equation EQ.1 is minimized by varying (e.g., fluctuating) rotation parameter R over a range of possible values while translation parameter T is held constant (to its most recently updated value in calibration profile 254). Although various error equations may be used for first equation EQ.1, in some implementations a variant of the Sampson error may be used as follows:

$$\text{EQ. } 1 = \sum_i \frac{(x_i' \cdot E \cdot x_i)^2}{(E \cdot x_i)_1^2 + (E \cdot x_i)_2^2 + (E^T \cdot x_i')_1^2 + (E^T \cdot x_i')_2^2}$$

where $(\cdot)k$ denotes the k-th component in the vector, $E=[T]_x \cdot R$ is the essential matrix, and x and x' are the corresponding features from left and right images in normalized image coordinates. Advantages of using this variant of the Sampson error in EQ.1 include: (1) the feature coordinates used are in normalized image coordinates, (2) the essential matrix E is more computationally efficient than the fundamental matrix, and (3) the intrinsics of the cameras are assumed to not change. In one particular implementation, essential matrix E is a 3×3 matrix. Once EQ.1 is minimized, the value of rotation parameter R for which the equation is minimized is set and outputted as calibrated rotation parameter R'.

Figure 15:
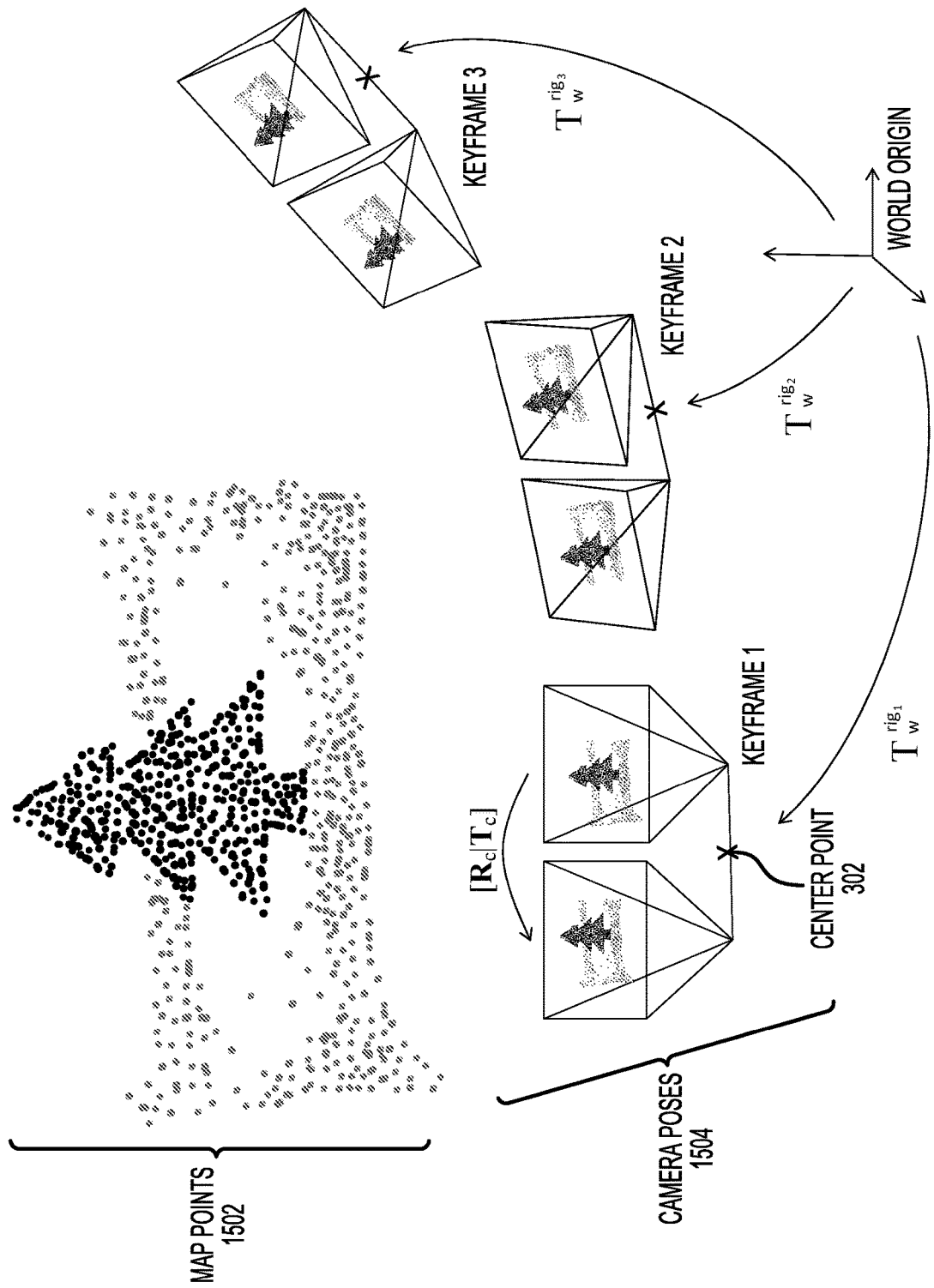
FIG. 15 illustrates various steps for performing bundle adjustment, according to some embodiments of the present invention.

If it is determined at block 1006 that the second calibration process is to be performed, method 1000 proceeds to block 1010 where online calibration 1052 is performed. Online calibration 1052 aims to minimize the reprojection error between observed and predicted image points with respect to rotation and translation of the sensors (e.g., cameras). At block 1010, a second equation EQ.2 is minimized by varying (e.g., fluctuating) translation parameter T and rotation parameter R over a range of possible values. Although various error equations may be used for second equation EQ.2, in some implementations the following error equation may be used:

$$\text{EQ. } 2 = \sum_i \sum_j \sum_{k \in \mathbb{C}} V_{ij} \cdot P(\Pi_j^k(T_{rig_j}^{c_k}, p_i), x_i^{j,k})$$

where i is the index for points, j is the index for rig positions at keyframes, k is the index for cameras, $\mathbb{C}$ is the set of cameras, $T_{rig_j}^{c_k}$ is the extrinsic transformation from rig to sensor k (e.g., camera k), $\Pi_j^k$ is the projection function for sensor k in rig j, $x_i^{j,k}$ is the measurement of 3D point $p_i$ in sensor k, P is the function to compute the reprojection error vector between two points, and $V_{ij}$ is a value of either 0 or 1 based on visibility of point i through sensor k located at keyframe position j (equal to 1 if visible and 0 if not visible). The projection function $\Pi_j^k$ is dependent on translation parameter T and rotation parameter R, as the transformation from rig center point to each sensor relates to T and R for each sensor. Once EQ.2 is minimized, the values of translation parameter T and rotation parameter R for which the equation is minimized are set and outputted as calibrated translation parameter T' and calibrated rotation parameter R', respectively. Additional description of the extrinsic transformation from rig to camera is illustrated in FIG. 15.

At block 1012, either one or both of calibrated translation parameter T' and calibrated rotation parameter R' are used to replace and/or update translation parameter T and rotation parameter R, respectively. If epipolar calibration 1050 was performed, then rotation parameter R is replaced and/or updated. If online calibration 1052 was performed, then both translation parameter T and rotation parameter R are replaced and/or updated. After performance of block 1012, method 1000 proceeds to block 1002, repeating the described steps.

Figure 11:
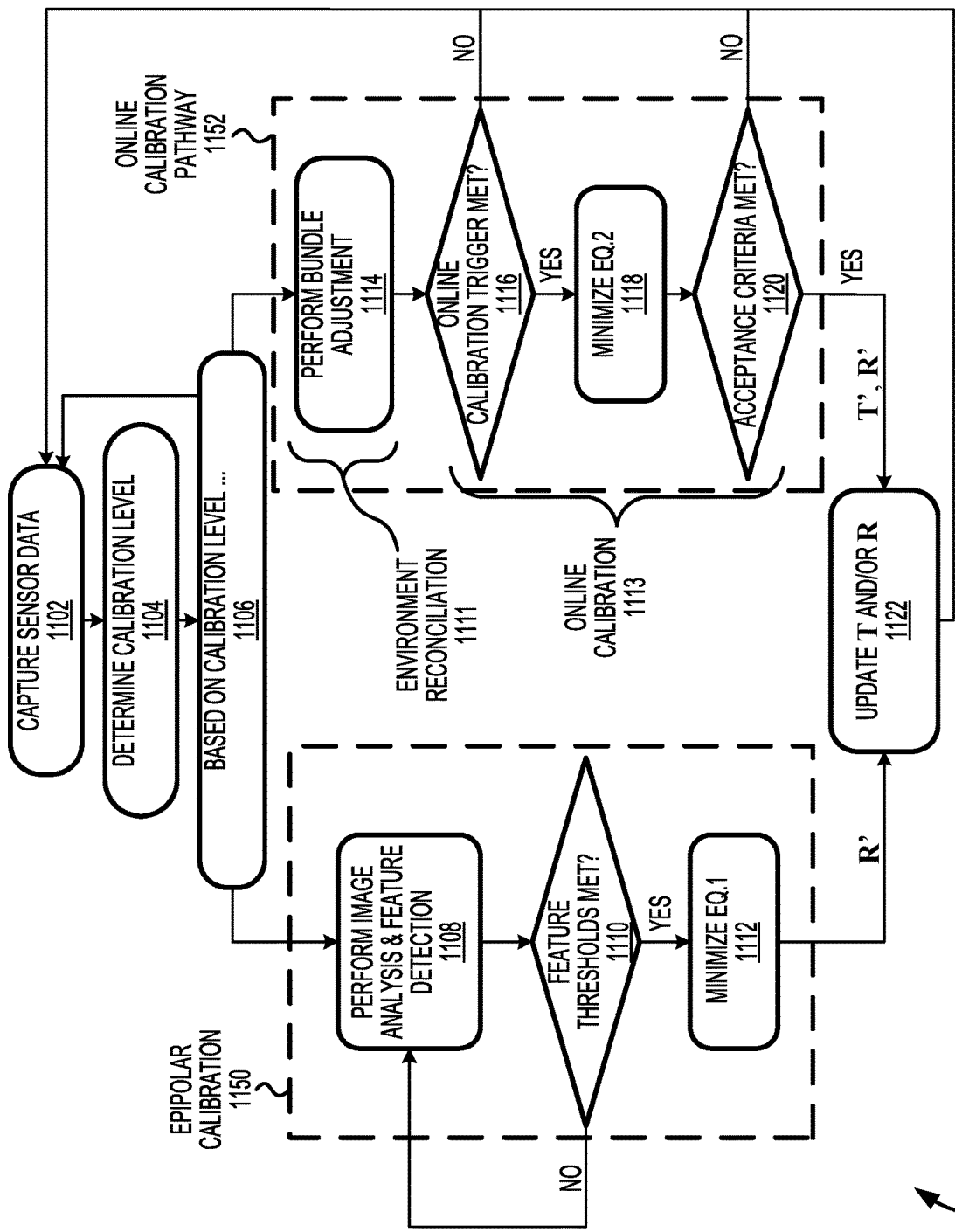
FIG. 11 illustrates a method for calibrating an AR device, according to some embodiments of the present invention.

FIG. 11 illustrates a method 1100 for calibrating AR device 200, according to some embodiments of the present invention. Performance of method 1100 may include performing more or fewer steps than those shown in FIG. 11, and steps of method 1100 need not be performed in the order shown. One or more steps of method 1100 may correspond to one or more steps of methods 800, 900, 1000. For example, method 1100 may comprise an epipolar calibration 1150, which may correspond to one or more steps described in reference to blocks 808 and 1008, and an online calibration pathway 1152, which may correspond to one or more steps described in reference to blocks 810 and 1010. Although method 1100 is described in reference to calibrating an AR device, the method may be used to calibrate any device having two sensors whose spatial relationship is modeled by a calibration profile having a translation parameter and a rotation parameter.

In some embodiments, method 1100 begins at block 1102 in which sensor data 220 is captured by sensors 206. Block 1102 may include one or more steps described in reference to block 802.

At block 1104, a calibration level of sensor data 220 is determined. Block 1104 may include one or more steps described in reference to blocks 804, 904. In some embodiments, block 1104 is performed by processing module 250.

At block 1106, it is determined whether to perform a first calibration process, a second calibration process, or neither based on the calibration level. Block 1106 may include one or more steps described in reference to block 806. In some embodiments, block 1106 is performed by processing module 250.

If it is determined at block 1106 that the first calibration process is to be performed, method 1100 proceeds to block 1108. At block 1108, image analysis and feature detection is performed on paired images captured by sensors 206A, 206B. In some embodiments, matched features between the paired images are detected or, in other embodiments, the matched features are received during or prior to performance of block 1108 from an external source. After obtaining the matched features and the paired images, each of the paired images are partitioned into a plurality of bins and the quantity of matched features that are located in each of the bins is determined. In various embodiments, each of the paired images are partitioned into the same number of bins, into different numbers of bins, or into bins that cover different regions of each of the paired images. In one particular embodiment, the bins may be defined by a 3×3 grid overlaid on the images. After determining the quantity of matched features for each bin, the quantities are outputted and method 1100 proceeds to block 1110.

At block 1110, it is determined whether the quantities of matched features located in each of the bins satisfy one or more feature thresholds. For example, it may be determined whether each of the quantities of matched features is greater than a feature threshold, e.g., 1, 10, 100, 1,000, and the like. In some embodiments, this inquiry may be performed on a bin-by-bin basis, such that method 1100 only proceeds to block 1112 when each of the quantities of matched features is greater than the feature threshold. In other embodiments, method 1100 may proceed to block 1112 when a majority or some requisite percentage of bins include a quantity of matched features greater than the feature threshold. In some embodiments, it may also be determined whether each of the quantities of matched features is less than a second feature threshold, e.g., 1,000, 10,000, and the like. This step may determine whether the matched features are evenly spread throughout the paired images. If it is determined that each of the quantities of matched features is greater than a first feature threshold and less than a second feature threshold, method 1100 may proceed to block 1112. Otherwise, method 1100 returns to block 1108 in which a second set of paired images are analyzed, e.g., paired images corresponding to a subsequent frame.

At block 1112, the steps described in reference to block 1008 are performed using the paired images and/or the matched features. Once EQ.1 is minimized, the value of rotation parameter R for which the equation is minimized is set and outputted as calibrated rotation parameter R'.

Returning to block 1106, if it is determined at block 1106 that the second calibration process is to be performed, method 1100 proceeds to an online calibration pathway 1152. Online calibration pathway 1152 may include multiple modules such as, for example, an environment reconciliation module 1111 and an online calibration module 1113. Environment reconciliation module 1111 may include steps to ensure the 3D point cloud data collected by AR device 200 over a predetermined period of time is aligned. At block 1114, bundle adjustment is performed by optimizing the sparse map (a group of map points and keyframe positions of AR device 200) each time a keyframe has occurred. Accordingly, prior to performing any remaining steps at block 1114, it may first be determined whether a keyframe has occurred. During operation of AR device 200, a keyframe occurs when it is determined, based on sensor data 220, that enough new information is present to warrant stable optimization, which corresponds to determining that AR device 200 has translated more than a translation threshold and rotated more than a rotation threshold (center point 302 being used as the location of AR device 200). As an example, the translation threshold may be 10 cm and the rotation threshold may be 10 degrees.

The sparse map may comprise map points collected from sensors 206. Map points may be captured by sensors 206 along different features in the field of view, and each map point is associated with the known position of AR device 200 (using center point 302) when the map point was captured. This gives context to the map points that are collected such that a 3D model of the environment can be accurately reconstructed and properly interpreted. When bundle adjustment is performed, the sparse map is optimized by aligning the map points included in the sparse map using an algorithm that minimizes alignment error between points. After the sparse map is optimized, method 1100 proceeds to online calibration module 1113.

Online calibration module 1113 may include several subprocesses or steps. At block 1116, it is determined whether an online calibration trigger has been met. The online calibration trigger may include one or more conditions such as, but not limited to: whether a keyframe occurred, whether consecutive keyframes occurred, whether a bundle adjustment was successful, whether consecutive bundle adjustments were successful, whether the maximum distance between keyframe poses of AR device 200 has translated more than a threshold baseline (e.g., 1.5 meters), whether the maximum rotation between keyframe poses of AR device 200 has rotated more than a threshold angle (e.g., 90 degrees), whether detected features are evenly distributed across the field of view, whether detected features are evenly distributed in the z-dimension (corresponding to depth), and the like. If the one or more conditions included in the online calibration trigger are not met, then method 1100 returns to block 1102. If the conditions are met, then method 1100 proceeds to block 1118.

At block 1118, the steps described in reference to block 1010 are performed using the optimized sparse map. In some embodiments, performance of block 1118 may use a larger data set than is used for bundle adjustment. For example, bundle adjustment may use the most recent 10 map point sets observed by the most recent 10 keyframes and camera pose positions to optimize the sparse map, while block 1118 may use the last 100 map point sets and camera pose positions. Once EQ.2 is minimized, the values of translation parameter T and rotation parameter R for which the equation is minimized are set and outputted as calibrated translation parameter T' and calibrated rotation parameter R', respectively.

At block 1120, calibrated translation parameter T' and calibrated rotation parameter R' are compared to preselected acceptance criteria. In some embodiments, the acceptance criteria may require that calibrated translation parameter T' and calibrated rotation parameter R' be sufficiently different from translation parameter T and rotation parameter R, respectively. In some embodiments, the differences T'-T and R'-R may be compared to thresholds. If it is determined that the acceptance criteria is satisfied, method 1100 may proceed to block 1122.

At block 1122, either one or both of calibrated translation parameter T' and calibrated rotation parameter R' are used to replace and/or update translation parameter T and rotation parameter R, respectively. If epipolar calibration 1150 was performed, then rotation parameter R is replaced and/or updated. If online calibration pathway 1152 was performed, then both translation parameter T and rotation parameter R are replaced and/or updated. After performance of block 1122, method 1100 returns to block 1102, repeating the described steps.

In some embodiments, performance of method 1100 may include performing only epipolar calibration 1150 (i.e., the first calibration process) or only online calibration pathway 1152 (i.e., the second calibration process). In some embodiments, online calibration pathway 1152 is performed at a first time (i.e., $t_1$) and epipolar calibration 1150 is performed at a second time (i.e., $t_2$). Conversely, in some embodiments, epipolar calibration 1150 is performed at a first time (i.e., $t_1$) and online calibration pathway 1152 is performed at a second time (i.e., $t_2$). In some embodiments, online calibration pathway 1152 is performed two times consecutively (i.e., at times $t_1$ and $t_2$) without performance of epipolar calibration 1150. Similarly, in some embodiments, epipolar calibration 1150 is performed two times consecutively (i.e., at times $t_1$ and $t_2$) without performance of online calibration pathway 1152. As described herein, first time (i.e., $t_1$) may precede or follow second time (i.e., $t_2$).

One of skill in the art will appreciate that calibrated translation parameter T' and calibrated rotation parameter R' may be used by AR device 200 in many ways. In one embodiment, T' and R' may be used as a basis for physically adjusting a position and/or an orientation of one or more sensors (e.g., sensors 206). Adjusting a position and/or an orientation of one or more sensors may improve overall performance of AR device 200 by controlling the position and/or orientation of at least one sensor relative to other components and/or other sensors on AR device 200.

Referring once again to FIG. 3, calibrated translation parameter T' and calibrated rotation parameter R' may be determined with respect to center point 302. However, it is possible to calibrate with respect to any other part of the system. For example, in some embodiments a single sensor is selected as a reference sensor from which to base all calibration corrections, such that parameters relating to the reference sensor are not adjusted, but parameters of all other sensors are adjusted in relation to the reference sensor. Other significant points on AR device 200 may also be used as a reference point from which to calculate calibrated parameters.

Figure 12:
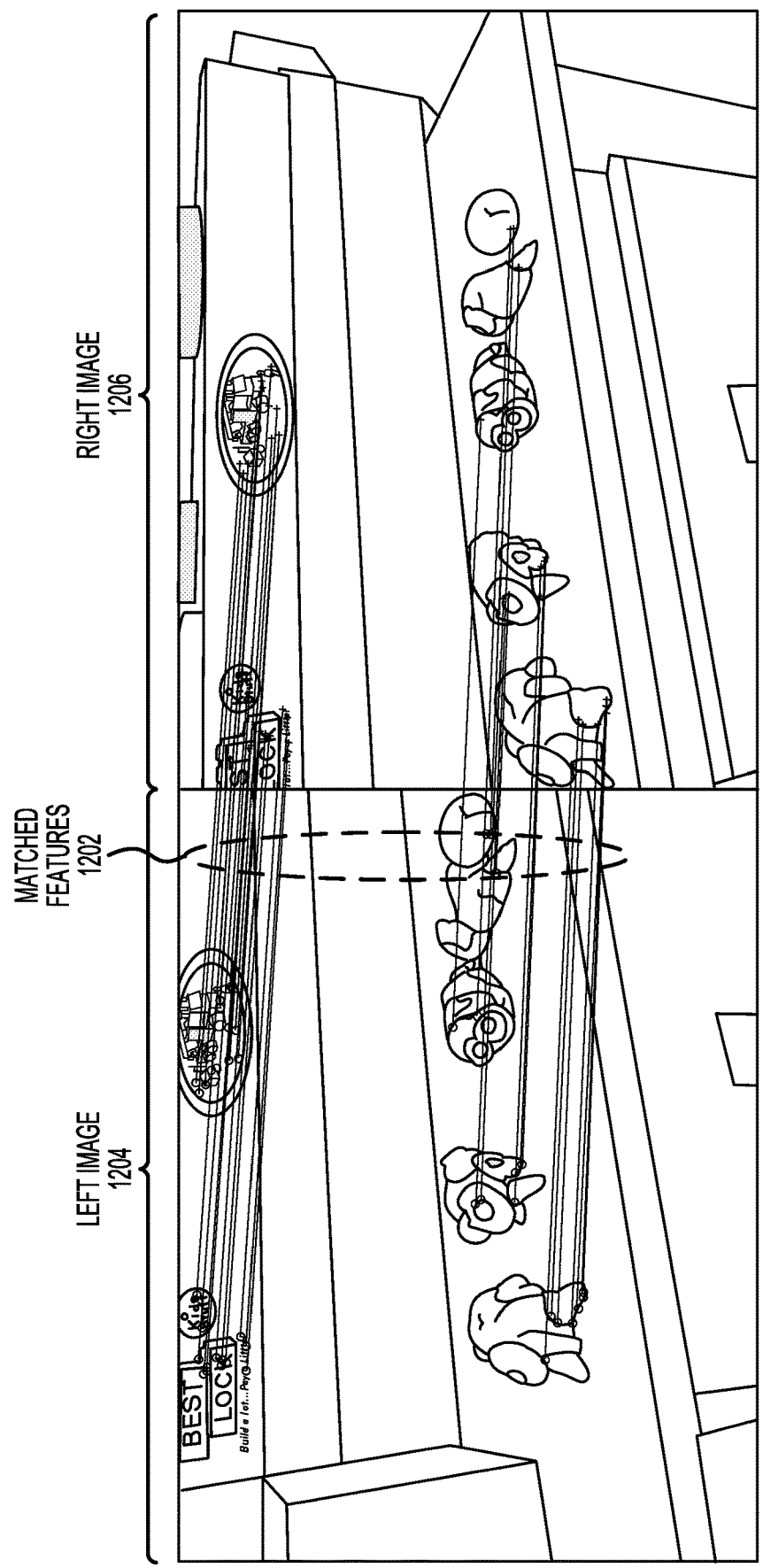
FIG. 12 illustrates various steps for detecting matched features between paired images, according to some embodiments of the present invention.

FIG. 12 illustrates various steps for detecting one or more matched features 1202 between a left image 1204 and a right image 1206 (i.e., paired images), according to some embodiments of the present invention. For example, FIG. 12 may illustrate one or more steps in connection with block 1108 as described in reference to FIG. 11. Each detected matched feature in left image 1204 maps to a detected matched feature in right image 1206, and vice-versa. Matched features may be detected based on corner detection techniques or any one of various conventional image processing techniques.

Figure 13:
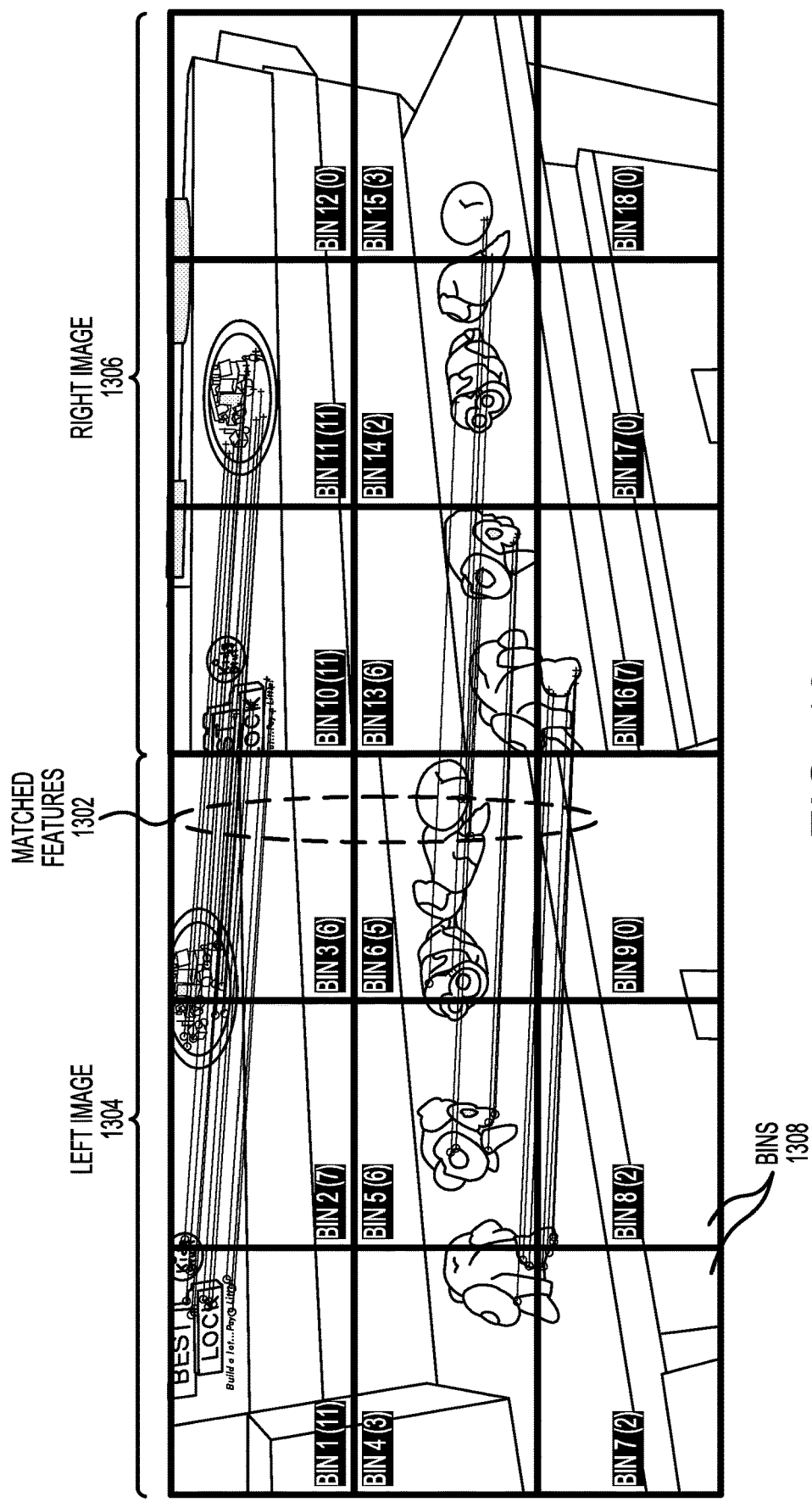
FIG. 13 illustrates various steps for partitioning paired images into bins and for determining the quantity of matched features located in each of the bins, according to some embodiments of the present invention.

FIG. 13 illustrates various steps for partitioning a left image 1304 and a right image 1306 into a plurality of bins 1308 and for determining the quantity of matched features 1302 located in each of bins 1308, according to some embodiments of the present invention. For example, FIG. 13 may illustrate one or more steps in connection with blocks 1108 and 1110 as described in reference to FIG. 11. Left image 1304 and right image 1306 may be camera images, depth images, among other possibilities. In the particular implementation shown in FIG. 13, each of left image 1304 and right image 1306 are partitioned into 9 bins in a 3×3 arrangement. In other embodiments, different numbers of bins and different arrangements of the bins are possible. For example, each of left image 1304 and right image 1306 may be partitioned into any number of bins (e.g., 4, 16, 25, 36, etc.) having various shapes (e.g., rectangular, triangular, circular, etc.). Bins may be overlapping or non-overlapping, and the arrangements of bins for left image 1304 and right image 1306 need not be identical. For example, left image 1304 may be partitioned into 4 bins in a 2×2 arrangement and right image 1306 may be partitioned into 6 bins in a 2×3 arrangement.

One or more feature thresholds may be defined that require a certain quantity of matched features to be present in each bin and/or in a group of bins. By way of example, feature thresholds may require that each of bins 1308 include 5 or more of matched features 1302. In the illustrated embodiment, the quantity of matched features in each bin is indicated in the parentheses to the right of the bin number. Because several of bins 1308 fail to meet the feature threshold (e.g., Bins 4, 7, 8, 9, 12, 14, 15, 17, and 18 each have fewer than 5 matched features), the feature thresholds are not satisfied. As a result, the current image pair, images 1304 and 1306, may optionally be discarded while the corresponding features from the image pair may be retained. As subsequent image pairs are retrieved and analyzed in the same manner, features are accumulated until each of the feature thresholds are satisfied. As another example, feature thresholds may require that each grouping of 4 adjacent bins in a 2×2 arrangement include 10 or more matched features. Because the grouping of Bins 14, 15, 17, and 18 only contains 5 matched features, the feature thresholds are not satisfied.

Figure 14A:
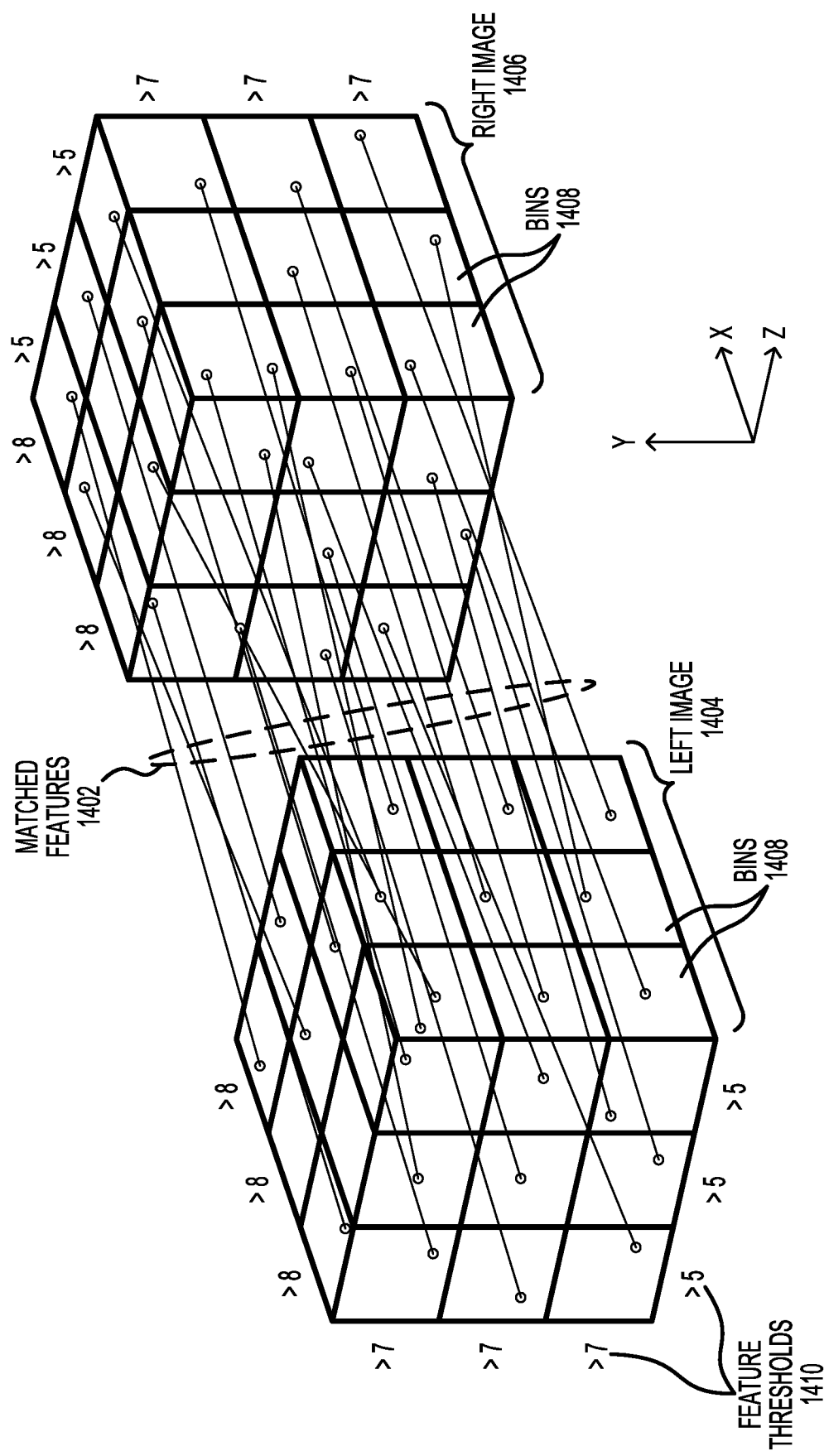
FIGS. 14A and 14B illustrate various steps for partitioning images into a plurality of bins in three-dimensional space, according to some embodiments of the present invention.
Figure 14B:
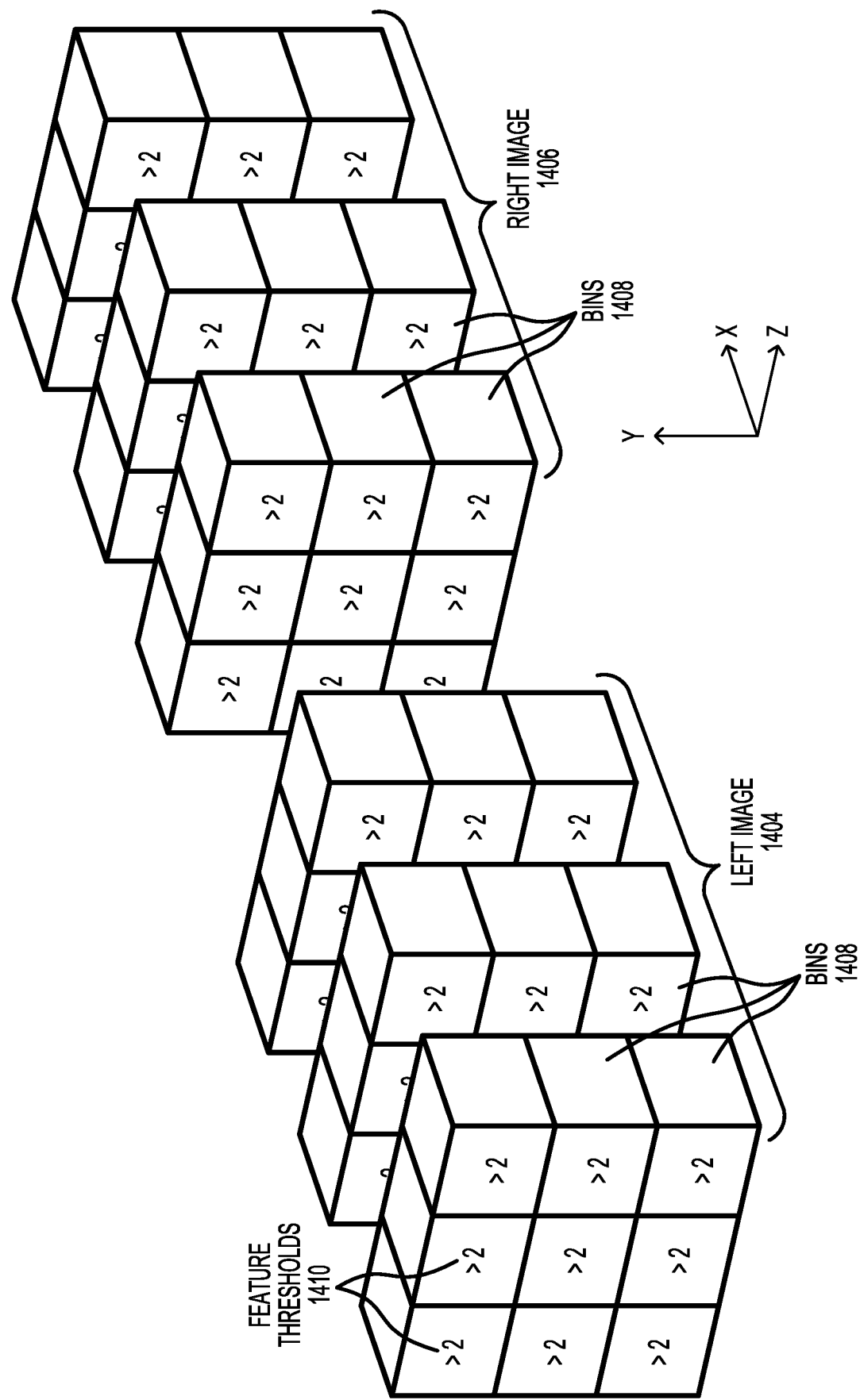

FIGS. 14A and 14B illustrate various steps for partitioning a left image 1404 and a right image 1406 into a plurality of bins 1408 in three-dimensional space and for determining the quantity of matched features 1402 located in each of bins 1408, according to some embodiments of the present invention. For example, FIGS. 14A and 14B may illustrate one or more steps in connection with blocks 1108 and 1110 as described in reference to FIG. 11. Left image 1404 and right image 1406 may be camera images, depth images, among other possibilities. Each of left image 1404 and right image 1406 are partitioned into 27 bins in a 3×3×3 arrangement. In other embodiments, different numbers, arrangements, and shapes of bins are possible. Bins may be overlapping or non-overlapping, and the arrangements of bins for left image 1404 and right image 1406 need not be identical.

In reference to FIG. 14A, feature thresholds are defined for groups of bins with each group comprising the bins that form a plane that extends in two of the three dimensions. For example, feature thresholds require that the groups of bins forming planes in the near field, the mid-field, and the far field (with respect to the Z dimension) each include 5 or more of matched features 1402. Feature thresholds also require that the groups of bins forming planes with respect to the X dimension each include 8 or more matched features and that the group of bins forming planes with respect to the Y dimension each include 7 or more matched features. FIG. 14B illustrates additional feature thresholds that require that each individual bin include 2 or more matched features. Accordingly, feature thresholds may be defined for individual bins and/or groups of bins to ensure an adequate spatial distribution of matched features 1402.

FIG. 15 illustrates various steps for performing bundle adjustment, according to some embodiments of the present invention. Shown in FIG. 15 are map points 1502 viewed by various camera poses 1504. Map points 1502 are captured by sensors 206A, 206B (and in some embodiments, sensors 206C, 206D) along different features in the field of view, and each of map points 1502 is associated with the known position of AR device 200 (center point 302) when the map point was captured. Collectively, map points 1502 as viewed from camera poses 1504 make up the sparse map. The sparse map is optimized by aligning the calculated projection of the map points included in the sparse map with the corresponding observed feature of the map points using an algorithm that minimizes alignment error between the calculated projection and the observed feature.

While the forgoing description has been given in reference to AR device 200 and model 300, other system configurations may also benefit from the calibration method described. For example, any device having two sensors with at least partially overlapping fields of view may be calibrated using the described model. The two sensors may be located on a same side of a device or on different sides. The two sensors may be displaced from each other in any of x-, y-, and z-dimensions, or a combination thereof. Additional sensors may be added to the system and calibrated using the methods disclosed. The additional sensors need not have overlapping fields of view with the first two sensors. It will be appreciated that two, three, four, or more additional sensors may be added to the system and can be calibrated using the method described.

Figure 16:
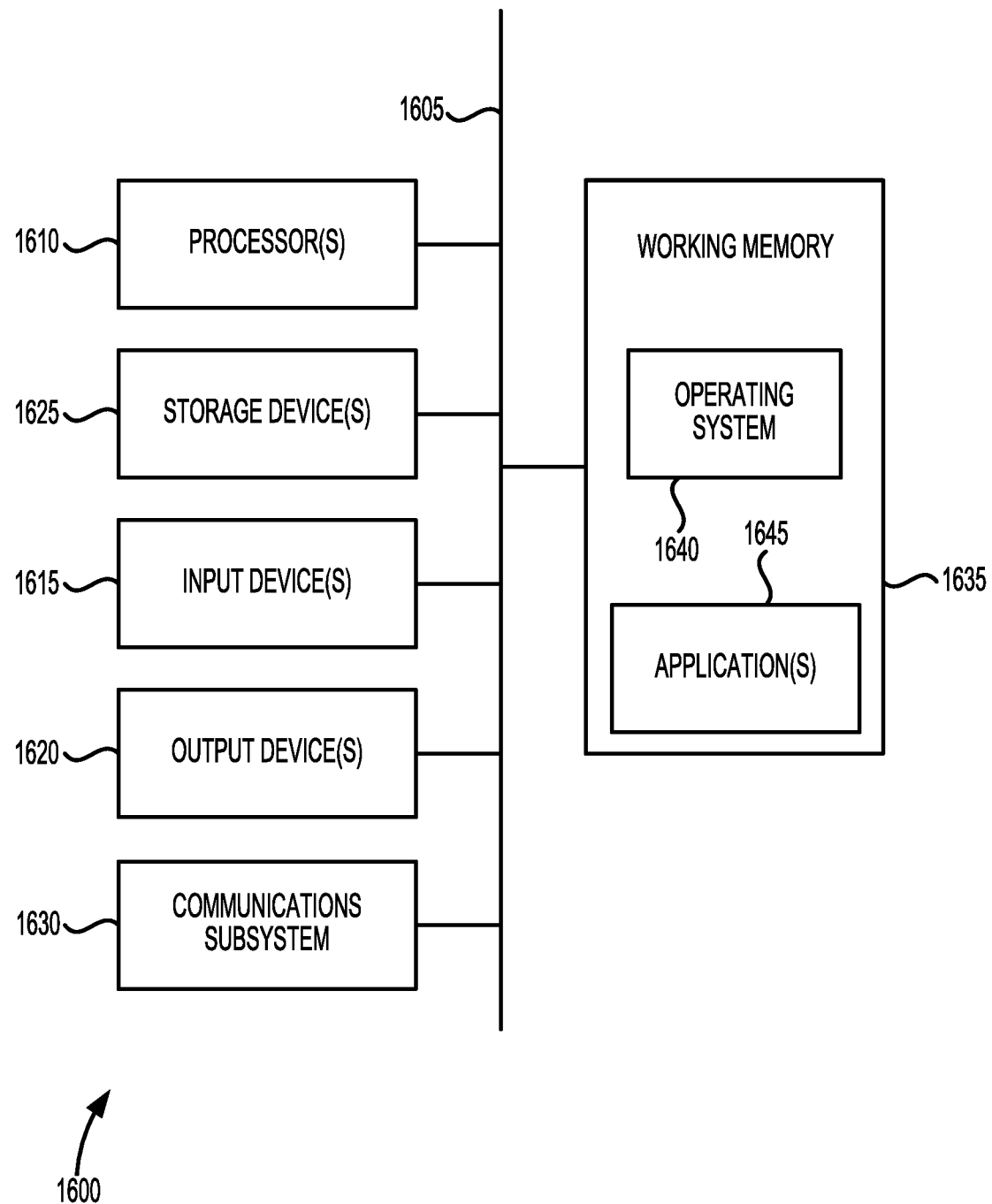
FIG. 16 illustrates a simplified computer system, according to some embodiments of the present invention.

FIG. 16 illustrates a simplified computer system 1600, according to an embodiment of the present invention. A computer system 1600 as illustrated in FIG. 16 may be incorporated into devices such as AR device 200 as described herein. FIG. 16 provides a schematic illustration of one embodiment of a computer system 1600 that can perform some or all of the steps of the methods provided by various embodiments. It should be noted that FIG. 16 is meant only to provide a generalized illustration of various components, any or all of which may be utilized as appropriate. FIG. 16, therefore, broadly illustrates how individual system elements may be implemented in a relatively separated or relatively more integrated manner.

The computer system 1600 is shown comprising hardware elements that can be electrically coupled via a bus 1605, or may otherwise be in communication, as appropriate. The hardware elements may include one or more processors 1610, including without limitation one or more general-purpose processors and/or one or more special-purpose processors such as digital signal processing chips, graphics acceleration processors, and/or the like; one or more input devices 1615, which can include without limitation a mouse, a keyboard, a camera, and/or the like; and one or more output devices 1620, which can include without limitation a display device, a printer, and/or the like.

The computer system 1600 may further include and/or be in communication with one or more non-transitory storage devices 1625, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer system 1600 might also include a communications subsystem 1630, which can include without limitation a modem, a network card (wireless or wired), an infrared communication device, a wireless communication device, and/or a chipset such as a Bluetooth™ device, an 802.11 device, a WiFi device, a WiMax device, cellular communication facilities, etc., and/or the like. The communications subsystem 1630 may include one or more input and/or output communication interfaces to permit data to be exchanged with a network such as the network described below to name one example, other computer systems, television, and/or any other devices described herein. Depending on the desired functionality and/or other implementation concerns, a portable electronic device or similar device may communicate image and/or other information via the communications subsystem 1630. In other embodiments, a portable electronic device, e.g. the first electronic device, may be incorporated into the computer system 1600, e.g., an electronic device as an input device 1615. In some embodiments, the computer system 1600 will further comprise a working memory 1635, which can include a RAM or ROM device, as described above.

The computer system 1600 also can include software elements, shown as being currently located within the working memory 1635, including an operating system 1640, device drivers, executable libraries, and/or other code, such as one or more application programs 1645, which may comprise computer programs provided by various embodiments, and/or may be designed to implement methods, and/or configure systems, provided by other embodiments, as described herein. Merely by way of example, one or more procedures described with respect to the methods discussed above, such as those described in relation to FIG. 16, might be implemented as code and/or instructions executable by a computer and/or a processor within a computer; in an aspect, then, such code and/or instructions can be used to configure and/or adapt a general purpose computer or other device to perform one or more operations in accordance with the described methods.

A set of these instructions and/or code may be stored on a non-transitory computer-readable storage medium, such as the storage device(s) 1625 described above. In some cases, the storage medium might be incorporated within a computer system, such as computer system 1600. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by the computer system 1600 and/or might take the form of source and/or installable code, which, upon compilation and/or installation on the computer system 1600 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware, software including portable software, such as applets, etc., or both. Further, connection to other computing devices such as network input/output devices may be employed.

As mentioned above, in one aspect, some embodiments may employ a computer system such as the computer system 1600 to perform methods in accordance with various embodiments of the technology. According to a set of embodiments, some or all of the procedures of such methods are performed by the computer system 1600 in response to processor 1610 executing one or more sequences of one or more instructions, which might be incorporated into the operating system 1640 and/or other code, such as an application program 1645, contained in the working memory 1635. Such instructions may be read into the working memory 1635 from another computer-readable medium, such as one or more of the storage device(s) 1625. Merely by way of example, execution of the sequences of instructions contained in the working memory 1635 might cause the processor(s) 1610 to perform one or more procedures of the methods described herein. Additionally or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using the computer system 1600, various computer-readable media might be involved in providing instructions/code to processor(s) 1610 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1625. Volatile media include, without limitation, dynamic memory, such as the working memory 1635.

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 1600.

The communications subsystem 1630 and/or components thereof generally will receive signals, and the bus 1605 then might carry the signals and/or the data, instructions, etc. carried by the signals to the working memory 1635, from which the processor(s) 1610 retrieves and executes the instructions. The instructions received by the working memory 1635 may optionally be stored on a non-transitory storage device 1625 either before or after execution by the processor(s) 1610.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A method for calibrating a device having a first sensor and a second sensor, the method comprising:
    capturing sensor data using the first sensor and the second sensor, wherein the device maintains a calibration profile to model a spatial relationship between the first sensor and the second sensor, the calibration profile including a translation parameter and a rotation parameter;
determining a calibration level associated with the calibration profile at a first time; and
determining, based on the calibration level, to perform either a first calibration process or a second calibration process;
wherein performing the first calibration process includes:
  generating a calibrated rotation parameter; and
  replacing the rotation parameter with the calibrated rotation parameter;
wherein performing the second calibration process includes:
  generating both a calibrated translation parameter and a calibrated rotation parameter; and
  replacing both the translation parameter and the rotation parameter with both the calibrated translation parameter and the calibrated rotation parameter.

2. The method of claim 1, wherein performing the first calibration process includes:
replacing only the rotation parameter with the calibrated rotation parameter.

3. The method of claim 1, further comprising:
determining a second calibration level associated with the calibration profile at a second time;
determining, based on the second calibration level, to perform either the first calibration process or the second calibration process.

4. The method of claim 1, wherein:
it is determined to perform the first calibration process when the calibration level is less than a calibration threshold; and
it is determined to perform the second calibration process when the calibration level is greater than the calibration threshold.

5. The method of claim 1, wherein the sensor data includes:
one or more first images captured using the first sensor; and
one or more second images captured using the second sensor.

6. The method of claim 1, wherein one or both of the calibrated translation parameter and the calibrated rotation parameter are generated using the sensor data.

7. The method of claim 1, wherein the calibration level is determined based on the sensor data.

8. The method of claim 1, further comprising:
capturing additional sensor data using an additional sensor that is separate from the first sensor and the second sensor, wherein the calibration level is determined based on the additional sensor data.

9. A device comprising:
a first sensor and a second sensor configured to capture sensor data;
a memory device configured to store a calibration profile modeling a spatial relationship between the first sensor and the second sensor, the calibration profile including a translation parameter and a rotation parameter;
a processor coupled to the first sensor, the second sensor, and the memory device, wherein the processor is configured to perform operations comprising:
determining a calibration level associated with the calibration profile at a first time; and
determining, based on the calibration level, to perform either a first calibration process or a second calibration process;
wherein performing the first calibration process includes:
  generating a calibrated rotation parameter; and
  replacing the rotation parameter with the calibrated rotation parameter;
wherein performing the second calibration process includes:
  generating both a calibrated translation parameter and a calibrated rotation parameter; and
  replacing both the translation parameter and the rotation parameter with both the calibrated translation parameter and the calibrated rotation parameter.

10. The device of claim 9, wherein performing the first calibration process includes:
replacing only the rotation parameter with the calibrated rotation parameter.

11. The device of claim 9, wherein the operations further comprise:
determining a second calibration level associated with the calibration profile at a second time;
determining, based on the second calibration level, to perform either the first calibration process or the second calibration process.

12. The device of claim 9, wherein:
it is determined to perform the first calibration process when the calibration level is less than a calibration threshold; and
it is determined to perform the second calibration process when the calibration level is greater than the calibration threshold.

13. The device of claim 9, wherein the sensor data includes:
one or more first images captured using the first sensor; and
one or more second images captured using the second sensor.

14. The device of claim 9, wherein one or both of the calibrated translation parameter and the calibrated rotation parameter are generated using the sensor data.

15. The device of claim 9, wherein the calibration level is determined based on the sensor data.

16. The device of claim 9, further comprising:
an additional sensor configured to capture additional sensor data, wherein the additional sensor is separate from the first sensor and the second sensor, and wherein the calibration level is determined based on the additional sensor data.

17. A non-transitory computer-readable medium for calibrating a device having a first sensor and a second sensor, the non-transitory computer-readable medium comprising instructions that, when executed by a processor, cause the processor to perform operations including:
capturing sensor data using the first sensor and the second sensor, wherein the device maintains a calibration profile to model a spatial relationship between the first sensor and the second sensor, the calibration profile including a translation parameter and a rotation parameter;
determining a calibration level associated with the calibration profile at a first time; and
determining, based on the calibration level, to perform either a first calibration process or a second calibration process;
wherein performing the first calibration process includes:
  generating a calibrated rotation parameter; and
  replacing the rotation parameter with the calibrated rotation parameter;

wherein performing the second calibration process includes:
  generating both a calibrated translation parameter and a calibrated rotation parameter; and
  replacing both the translation parameter and the rotation parameter with both the calibrated translation parameter and the calibrated rotation parameter.

18. The non-transitory computer-readable medium of claim 17, wherein performing the first calibration process includes:
  replacing only the rotation parameter with the calibrated rotation parameter.

* * * * *